(12) United States Patent
Enomoto et al.

(10) Patent No.: US 7,620,242 B2
(45) Date of Patent: Nov. 17, 2009

(54) PARTICULAR-REGION DETECTION METHOD AND APPARATUS, AND PROGRAM THEREFOR

(75) Inventors: Jun Enomoto, Kanagawa (JP);
Takayuki Iida, Kanagawa (JP);
Takafumi Matsushita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 965 days.

(21) Appl. No.: 11/099,698

(22) Filed: Apr. 6, 2005

(65) Prior Publication Data

US 2005/0238217 A1   Oct. 27, 2005

(30) Foreign Application Priority Data

Apr. 6, 2004   (JP)   ............... 2004-112143

(51) Int. Cl.
*G06K 9/00* (2006.01)
*H04N 9/07* (2006.01)
(52) U.S. Cl. .................. 382/167; 382/118; 248/267
(58) Field of Classification Search .................. 382/115, 382/116, 117, 118, 128, 162, 163, 167; 348/48, 348/267; 351/206, 209
See application file for complete search history.

(56) References Cited

U.S. PATENT DOCUMENTS

| 6,445,819 | B1 * | 9/2002 | Kinjo ........................... 382/173 |
| 7,155,037 | B2 * | 12/2006 | Nagai et al. ................... 382/118 |
| 7,343,028 | B2 * | 3/2008 | Ioffe et al. .................... 382/118 |
| 7,409,091 | B2 * | 8/2008 | Sung et al. .................... 382/191 |

| 2003/0044177 | A1 | 3/2003 | Oberhardt et al. |
| 2004/0233299 | A1 | 11/2004 | Ioffe et al. |
| 2005/0207649 | A1 | 9/2005 | Enomoto et al. |
| 2005/0238217 | A1 | 10/2005 | Enomoto et al. |

FOREIGN PATENT DOCUMENTS

| JP | 2000-137788 A | 5/2000 |
| JP | 2000-148980 A | 5/2000 |
| JP | 2000-149018 A | 5/2000 |

OTHER PUBLICATIONS

Sergey Ioffe, "Red Eye Detection with Machine Learning", IEEE, 2003, pp. 871-874.
K. Mikolajczyk, et al., "Face detection in a video sequence—a temporal approach", IEEE, 2001, pp. 96-101.
Antonio Haro, et al., "Detecting and Tracking Eyes by Using Their Physiological Properties, Dynamics, and Appearance", IEEE, 2000, pp. 1-6.

* cited by examiner

*Primary Examiner*—Abolfazl Tabatabai
(74) *Attorney, Agent, or Firm*—Sughrue Mion, PLLC

(57) ABSTRACT

The particular region detecting method and apparatus detect particular region candidates in an image, then perform face detection in a region including one of the detected particular region candidates and specify as a particular region of a detection target the one candidate included in the region where a face can be detected. In the method and apparatus, detection conditions is changed for at least one of the candidate detection and the face detection between main and non-main portion regions of the image, face information regarding the face detected in the region is stored and the face detection corresponding to a particular region candidate to be next subjected to the face detection is performed using the thus stored face information. The program is caused a computer to execute the method.

17 Claims, 11 Drawing Sheets

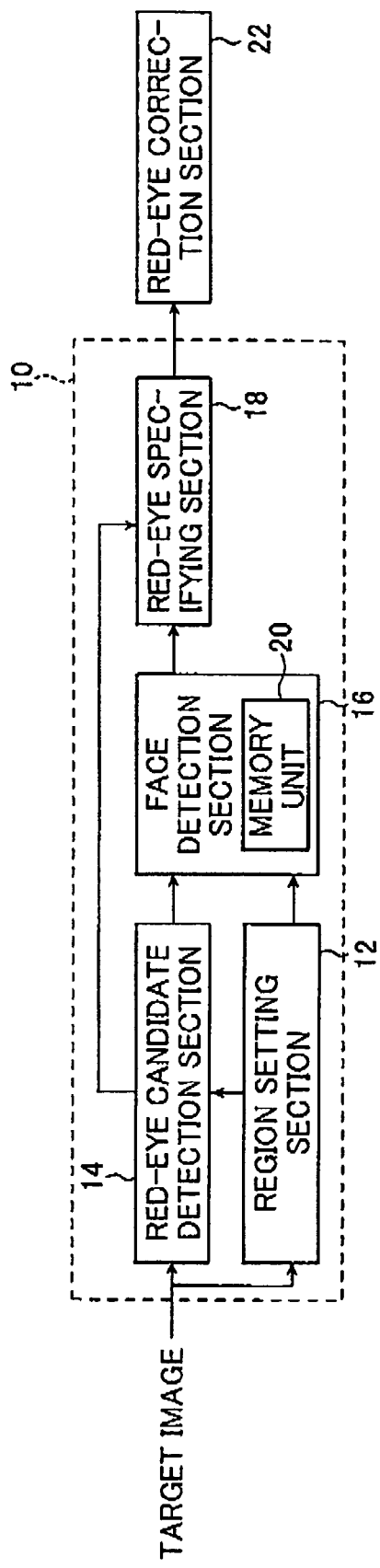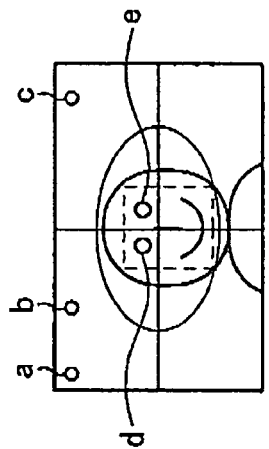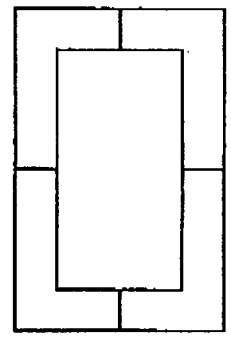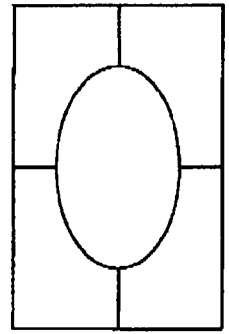

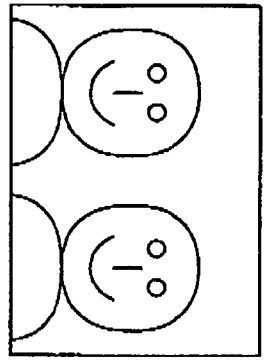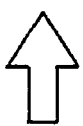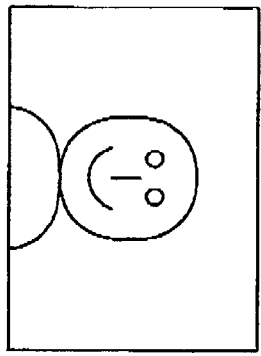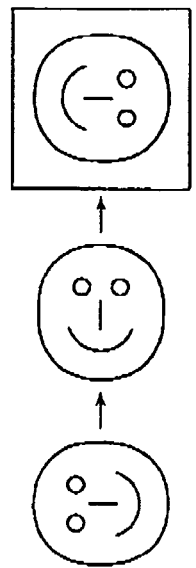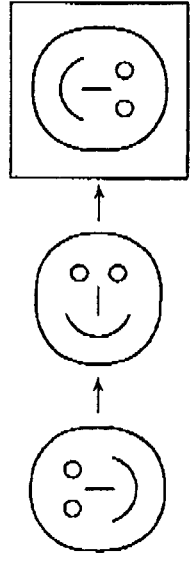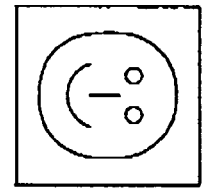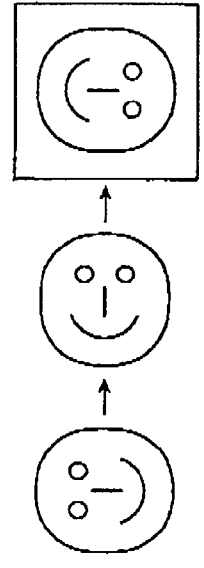
FIG. 3A  FIG. 3B  FIG. 3C

PARTICULAR-REGION DETECTION METHOD AND APPARATUS, AND PROGRAM THEREFOR

This application claims priority on Japanese patent application No. 2004-112143, the entire contents of which are hereby incorporated by reference.

BACKGROUND OF THE INVENTION

The present invention belongs to a technical field of image processing for detecting a particular region such as a red eye and a golden eye in a face region in an image caught on a photographic film or an image taken by a digital camera. In particular, the present invention relates to a method and apparatus for detecting a particular region which enable high-speed detection of a red eye, a golden eye or the like from an image, and a program for implementing such a particular-region detection method.

There has recently been put to practical use a digital photoprinter for photoelectrically reading an image recorded on a film, converting the read image into a digital signal, subsequently executing various image processing operations to convert the digital signal into image data for recording, executing photosensitive material exposure by a recording light modulated in accordance with the image data, and outputting the image as a print.

In the digital photoprinter, the image caught on the film is photoelectrically read, the image is converted into the digital image data, and the image processing and the photosensitive material exposure are executed. Accordingly, prints can be created from not only the image caught on the film but also the image (image data) taken by the digital camera or the like.

With recent popularization of a personal computer (PC), a digital camera, and an inexpensive color printer such as an ink-jet printer, many users load images taken by the digital cameras into their PC's, carry out image processing, and output the images by using the printers.

In addition, there has recently been put to practical use a printer for directly reading image data from a storage medium storing an image taken by a digital camera, executing predetermined image processing, and outputting a print (hard copy). Examples of the storage medium include a magneto-optical recording medium (MO or the like), a compact semiconductor memory medium (Smart Media™, Compact Flash™ or the like), a magnetic recording medium (flexible disk or the like), and an optical disk (CD, CD-R, or the like).

Incidentally, in an image that contains a person, such as a portrait, a most important factor to determine the image quality is a reproducibility of the person. Thus, a red-eye phenomenon in which eyes (pupils) of the person look red because of an influence of an electronic flash used during photographing is a serious problem.

In the conventional analog photoprinter that executes exposure directly through the film, red-eye correction is very difficult. However, in the case of the digital image processing of the digital photoprinter or the like, red eyes are detected by image processing (image analysis), and the red eyes can be corrected by correcting luminance or chroma of the red-eye regions.

As a method of detecting red eyes from an image when the red-eye correction process is carried out, for example, there is a method of detecting a face from an image by image data analysis, and then detecting eyes or red circles from the detected face. There have also been proposed various face detection methods used for the red-eye detection.

For example, JP 2000-137788 A discloses a method of improving accuracy of face detection as described below. A candidate region assumed to correspond to a face of a person is detected in an image, this candidate region is divided into a predetermined number of small blocks, a feature amount regarding frequency or amplitude of a change in density or luminance is obtained for each small block, and the feature amount is collated with a pattern indicating feature amount for each of small blocks which are obtained by dividing the pre-created region corresponding to the face of the person into a predetermined number. Accordingly, it is possible to improve the accuracy of the face detection by evaluating the degree of assurance that the face candidate region is a face region.

As another example, JP 2000-148980 A discloses a method of improving accuracy of face detection as follows: At first, a candidate region assumed to correspond to a face of a person is detected in an image, next, a region assumed to be a body is set by using the face candidate region as a reference when a density of the face candidate region is within a predetermined range, and then the degree of the assurance of a detection result of the face candidate region is evaluated based on the presence of a region in which a density difference between the set body region and the face candidate region is equal to or less than a predetermined value, or based on contrast of density or chroma between the face candidate region and the body candidate region.

Furthermore, JP 2000-149018 A discloses a method of detecting candidate regions assumed to correspond to faces of persons in an image by various detection analyses, obtaining a degree of overlapping of one among the detected candidate regions with another candidate region in the image, and evaluating a region of a higher degree of overlapping to be higher in the assurance of a face region. Accordingly, it is possible to improve the accuracy of the face detection.

The face detection requires accuracy, and various analyses are necessary. Thus, ordinarily, the face detection must be performed in high-resolution image data (so-called fine scan data in the case of image data read from a film, or taken-image data in the case of the digital camera) used for outputting a print or the like, and that causes a lot of time for detection.

Besides, there can be basically four directions of a face in a taken image depending on the orientation of a camera (horizontal and vertical positions and the like) during photographing. Here, if face directions are different, arraying directions of an eye, a nose, and the like naturally vary in vertical and horizontal directions in the image. Thus, to reliably detect the face, face detection must be performed in all the four directions in the image.

There are various face sizes in the image depending on object distances or the like. If face sizes are different in the image, a positional relation (distance) between an eye, a nose, and the like naturally varies in the image. Thus, to reliably detect the face, face detection must be performed corresponding to various face sizes.

As a result, the red-eye correction process takes much time because the red-eye detection, especially the face detection, becomes a rate-limiting factor. For example, in the case of the digital photoprinter, high-quality images of no red eyes can be stably output, but the long processing time is a major cause of reduction in productivity.

In this connection, an electronic flash possibly used during photographing may cause a golden-eye phenomenon in a taken image, in which the eyes (pupils) of an object person look, golden, as well as a red-eye phenomenon in which the eyes (pupils) look red. Although not so serious as the red-eye phenomenon, the golden-eye phenomenon is another problem in photographic images and the golden-eye correction involves difficulties similar to those of the red-eye correction.

SUMMARY OF THE INVENTION

The present invention has been made to solve the problems inherent in the conventional art, and an object of the present invention is to provide a method of detecting a particular region, capable of detecting particular regions likely to be present in a face in an image such as red eyes, golden eyes, or eye corners at a high speed, stably outputting high-quality images with no red eyes or golden eyes, for example, and greatly improving printer productivity; an apparatus for detecting a particular region which is used to implement such a method of detecting a particular region; and a program for implementing such a particular-region detection method.

In order to attain the object described above, a method of detecting particular regions according to the present invention comprises: detecting particular region candidates in an image; then performing face detection in a region including one of the thus detected particular region candidates; and specifying as a particular region of a detection target the particular region candidate that is included in the region where a face can be detected; wherein detection conditions is changed for at least one of the detection of the particular region candidates and the face detection between main and non-main portion regions of the image, face information regarding the face detected in the region including the particular region candidate is stored, and the face detection corresponding to a particular region candidate to be next subjected to the face detection is performed using the thus stored face information.

And, in order to attain the object described above, an apparatus for detecting particular regions according to the present invention comprises: particular region candidate detection means for detecting particular region candidates from an image using fed image data of the image; face detection means for performing face detection in a region including one of the particular region candidates detected by the particular region candidate detection means; specifying means for specifying as a particular region of a detection target the particular region candidate that is included in the region where a face can be detected by the face detection means; and storing means for storing face information regarding the face detected in the region including the particular region candidate by the face detection means, wherein at least one of the particular region candidate detection means and the face detection means changes detection conditions of the detection target between main and non-main portion regions of the image, and the face detection means reads the face information from the storing means and uses the thus read face information to perform the face detection corresponding to a particular region candidate to be next subjected to the face detection.

In the apparatus for detecting particular regions, preferably, the face detection means has: a first face detection mode in which the face detection means performs the face detection by changing the detection conditions of the detection target between the main and non-main portion regions of the image and, in addition, reading the face information from the storing means for use in the face detection when performing the face detection corresponding to the particular region candidate to be next subjected to face detection; a second face detection mode in which the face detection means performs the face detection without distinguishing between the main and non-main portion regions of the image, and by reading the face information from the storing means for use in the face detection when performing the face detection corresponding to the particular region candidate to be next subjected to the face detection; and a third face detection mode in which the face detection means performs the face detection using no face information stored, and by changing the detection conditions between the main and non-main portion regions of the image, and wherein the face detection means selects one of the first, second and third face detection modes to perform the face detection in accordance with input instruction.

Further, in order to attain the object described above, a program according to the present invention for causing a computer executes: a particular region candidate detection step of detecting particular region candidates from an image using fed image data of the image; a face detection step of performing face detection in a region including one of the particular region candidates detected in the particular region candidate detection step; a specifying step of specifying as a particular region of a detection target the particular region candidate that is included in the region where a face can be detected in the face detection step; and a storing step of storing in a storage medium face information regarding the face detected in the region including the particular region candidate by the face detection step, wherein the computer is caused to change detection conditions of the detection target between main and non-main portion regions of the image in at least one of the particular region candidate detection step and the face detection step, and perform the face detection in the face detection step by reading the face information from the storage medium for use in the face detection when performing the face detection corresponding to a particular region candidate to be next subjected to the face detection.

In the method of detecting particular regions, the apparatus for detecting particular regions and the program according to the present invention, preferably, the particular regions include a region of a red eye or a golden eye; the main portion region is an image center region which is previously determined; a region in which the particular region candidates concentrate is set as the main portion region during the face detection; the particular region candidate to be next subjected to the face detection is at least one of a particular region candidate to be next subjected to the face detection in the image and a particular region candidate to be first subjected to face detection in a next image; the face information is information regarding face direction, and the face detection corresponding to the particular region candidate to be next subjected to the face detection is performed initially for the face direction stored; and the face information is information regarding face size, and the face detection corresponding to the particular region candidate to be next subjected to the face detection is performed initially for the face size stored.

With the configuration of the present invention, upon the face detection for detecting a particular region likely to be present in the face region of an image such as a red eye, a golden eye, or an eye corner, face detection in a region in which the particular region is not present is made unnecessary, and face detection corresponding to all face directions, vertical and horizontal, on an image surface (all of the vertical and horizontal directions on an image surface in any of which the vertex can be pointed) or face detection corresponding to every assumed face size is made unnecessary. Besides, it is possible to reduce the need for the face detection corresponding to any insignificant object. Accordingly, it is possible to detect a particular region such as a red eye or golden eye at a high speed.

Thus, according to the present invention, for example, high speed red-eye or golden-eye detection enables quick red-eye or golden-eye correction. For example, in the photoprinter that creates a photographic print from image data obtained by photoelectrically reading a photographic film, image data taken by a digital camera, or the like, it is possible to minimize reduction in productivity and stably output a high image quality print with no red eyes or golden eyes.

BRIEF DESCRIPTION OF THE DRAWINGS

In the accompanying drawings:

FIG. 1A is a block diagram conceptually showing an example of a red-eye detector according to the present invention, and FIGS. 1B to 1D are conceptual diagrams each illustrating red-eye detection according to the present invention;

FIGS. 3A to 3C are conceptual diagrams illustrating red-eye detection according to a conventional art and the present invention;

DETAILED DESCRIPTION OF THE PREFERRED EMBODIMENT

Figures 2A, 2B, 2C, 2D:
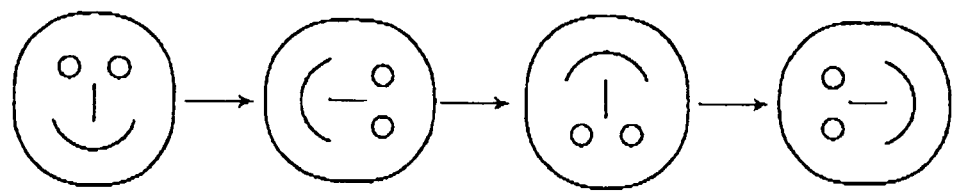
FIGS. 2A to 2E are conceptual diagrams illustrating a face detection method.

Hereinafter, preferred embodiments of a method and apparatus for detecting a particular region, and a program therefor of the present invention will be described in detail with reference to the accompanying drawings.

In the following description, detection of a red eye as a particular region likely to be present in a face region of an image will be taken as a typical example. However, the present invention is not limited to this example. Needless to say, the present invention is also applicable to the detection of golden eyes and so forth.

FIG. 1A is a conceptual block diagram of an embodiment in which the particular-region detector of the present invention for implementing the particular-region detection method of the present invention is used for a red-eye detector. The program of the present invention is a program for causing a computer to execute a detection process described below.

A red-eye detector (referred to as a detector, hereinafter) 10 shown in FIG. 1A detects a red eye from an input image (its image data) as a target of red-eye detection, and send an output to red-eye correction section 22, and includes region setting section 12, red-eye candidate detection section 14, face detection section 16, and red-eye specifying section 18. The detector 10 is configured by using a computer such as a personal computer or a work station, a digital signal processor (DSP) or the like as an example.

It is to be noted that the detector 10 and the red-eye correction section 22 may be constructed integrally, or the detector 10 (alone or in combination with the red-eye correction section 22) may be incorporated in an image processor (means) for performing various image processing operations such as color/density correction, gradation correction, electronic scaling, and sharpness processing.

In the detector 10 of the present invention, there is no particular limitation on an image as a target of red-eye detection (target image hereinafter) as long as it is a color image. For example, an image caught on a photographic film by a camera (image data being obtained by photoelectrically reading a caught image from a photographic film), or an image (image data) taken by a digital camera may be used. Needless to say, the target image may be an image (image data) subjected to various image processing operations as occasion demands in place of a taken image itself.

Since the present invention is not limited to the detection of red eyes but also applicable to the detection of golden eyes and so forth as referred to before, an image to be subjected to golden-eye detection, as well as an image to be subjected to red-eye detection, will do as the target image for the detector 10 of the invention.

The red-eye and golden-eye phenomena are described in detail in JP 2000-76427 A. In the red-eye phenomenon, the eyes (pupils) of an object person in a taken image look red due to, for instance, an electronic flash used during the photographing. To be more specific: A large quantity of light from the electronic flash is incident on the retina of the open eyes of the person through the pupils and then reflected from the retinae to form an image on a photographic film or an image pickup device such as CCD after passing through a lens system of a camera. Many blood vessels are concentrated at the retinae so that the eyes (pupils) of the person in the taken image look red. The golden-eye phenomenon is different a bit from the red-eye phenomenon. When a large quantity of light is incident on the retinae of the open eyes of the person through the pupils, parts of the incident light may be reflected on the blind spots which are points on the retinae where nerves are concentrated. If such reflected light forms an image on a film and so forth in a camera, the golden-eye phenomenon will occur, that is to say, the eyes (pupils) of the person in the taken image do not look red but golden. It should be noted that the red-eye and golden-eye phenomena as above may occur in the case of the eyes not only of a human being but also an animal such as cat. Depending on its kind, the animal in a taken image may have the eyes in a color other than red or golden color.

In the following, the red eye is described as a representative of phenomena in which the eyes of a person or animal in a taken image look red, golden, or otherwise in color.

The target image input to the detector 10 is first fed to the region setting section 12 and the red-eye candidate detection section 14.

The region setting section 12 sets main and non-main portion regions in the fed target image, and feeds a result of the setting (e.g., a pixel number or coordinate data indicating a region) to the red-eye candidate detection section 14 and the face detection section 16.

In the illustrated example, the region setting section 12 has a template for setting regions as shown in FIG. 1B or FIG. 1C. As occasion demands, the region setting section 12 enlarges/reduces the template (or the target image), applies the template to the target image, sets a center region of the image (corresponding to the central elliptical region in the case of FIG. 1B, or the central rectangular region in the case of FIG. 1C) as a main portion region, sets other regions as non-main portion regions, and sends results of the setting to the red-eye detection section 14 and the face detection section 16.

It is to be noted that in place of the enlargement/reduction of the template, templates of several sizes may be prepared in accordance with any possible target image sizes, or use of templates of several sizes may be combined with the enlargement/reduction.

There is no particular limitation on a method of determining an image center region as a main portion region. A region may be properly determined in accordance with properties required of the detector. For example, as a main portion region is larger, a processing time of red-eye detection is longer. However, accuracy of the red-eye detection is higher for the entire image. Accordingly, in an exemplary method, an image center region is determined as a main portion region properly in accordance with the processing time and processing accuracy required of the detector.

Additionally, a plurality of templates different from one another in size of the central region for the determination of an image center region as a main portion region may be prepared to be selected, and/or the central region for the determination of an image center region as a main portion region may be optionally set in a predetermined template.

According to the present invention, the method of setting main and non-main portion regions is not limited to the method of setting the regions by dividing the entire image into center and peripheral regions. Various methods can be used.

For example, a method of performing image analysis to set a focused region as a main portion region and other regions as non-main portion regions may be employed. Extraction of the focused region of the image may use a known method.

In general cases inclusive of the case of photographing with an electronic flash, a region corresponding to a main portion of an image tends to gain higher luminance than the background region. Taking advantage of this fact, it is also possible to set a region having luminance higher than a threshold value in an image as a main portion region, and the rest as non-main portion regions. Alternatively, the guide number of the electronic flash, irradiation region, focal distance, and distance measurement information are determined from various kinds of information recorded in an image file or magnetic information recorded on a film for APS, and a region irradiated with the light of the electronic flash may be set as a main portion region, and the other regions not irradiated with the light of the electronic flash may be set as non-main portion regions.

Further, it is possible to set as a main portion region a region in which red-eye candidate regions detected by the red-eye candidate detection section 14 are concentratedly present, with respect to the face detection described later. A detailed description will be given later on this point.

The red-eye candidate detection section 14 detects a region likely to be a red eye, i.e., a red-eye candidate, from the target image, and feeds positional information of the red-eye candidate (coordinate information of its center), region information, information on the number of candidates, and the like as red-eye candidate information to the face detection section 16 and the red-eye specifying section 18.

For example, as shown in FIG. 1D, a person is photographed in a scene having three red lamps on the background. If a red-eye phenomenon occurs in the person in the taken image (scene), regions indicated by "a" to "c" corresponding to the red lamps, and regions indicated by "d" and "e" corresponding to red eyes are detected as red-eye candidates to be fed to the face detection section 16 and the red-eye specifying section 18.

There is no particular limitation on methods of detecting red-eye candidates. Various known methods may be used.

An example thereof is a method of extracting a region of a red hue in which pixels congregate in a predetermined number or more, and using the red eye similarity (how much a region is likely to be a red eye in color) and the circularity (how much a region is round) both preset from many red-eye image samples to detect the region whose red eye similarity and circularity exceed the respective threshold values as a red-eye candidate having a possibility of being a red eye.

Here, in the illustrated detector 10, in accordance with a processing sequence of the red-eye detection to be executed, red-eye candidate detection conditions are changed between the main and non-main portion regions previously set by the region setting section 12.

For example, in the main portion region, a region is detected as a red-eye candidate even if a possibility of being a red eye is low. In the non-main portion region, only a region of a high possibility of being a red eye is detected as a red-eye candidate. Specifically, when, as described above, a region whose red eye similarity and circularity exceed the respective threshold values is detected as a red-eye candidate, red-eye detection is carried out by reducing the threshold values in the main portion region. Conversely, red-eye detection may be carried out by increasing the threshold values in the non-main portion region. Thus, in the case as shown in FIG. 1D, for example, red-eye candidates "d" and "e" in the main portion region are red-eye candidates detected by use of threshold values lower than those for red-eye candidates "a" to "c" in the non-main portion region.

At the face detection section 16 (described later), face detection is carried out only around the red-eye candidates. Accordingly, face detection processing is reduced in the non-main portion region of lower importance. In other words, it is possible to shorten the processing time of the red-eye detection by reducing a face detection processing amount with the face detection section 16.

A detection result of the red-eye candidate with the red-eye candidate detection section 14 and results of the setting of the main and non-main portion regions with the region setting section 12 are sent to the face detection section 16. The face detection section 16 executes face detection in an area including the red-eye candidate detected by the red-eye candidate detection section 14 based on the red-eye detection result (e.g., the positional information), and feeds information on the red-eye candidate included in the region in which a face is detected, or even a face detection result to the red-eye specifying section 18.

For example, in the example shown in FIG. 1D, face detection operations are sequentially performed in predetermined regions including the red-eye candidates "a" to "e", respectively, corresponding to the individual red-eye candidates. An example thereof is that face detection is first carried out in a predetermined region including the red-eye candidate "d" corresponding to the red-eye candidate "d", similar face detection is then carried out corresponding to the red-eye candidate "e", similar face detection is carried out corresponding to the red-eye candidate "a", similar face detection is then carried out corresponding to the red-eye candidate "b", and lastly similar face detection is carried out corresponding to the red-eye candidate "c".

In consequence, when the face detection operations are carried out corresponding to the red-eye candidates "d" and "e", for example, a region surrounded with a dotted line is detected as a face region. Accordingly, the face detection section 16 feeds information that the red-eye candidates "d"

and "e" are the red-eye candidates in the face region, or even information on the detected face region to the red-eye specifying section 18.

As described above, the face detection is a process which takes much time. In the conventional red-eye detection, red-eye detection is executed in a detected face region after face detection is carried out. Thus, face detection is carried out even in a region having no red eyes, resulting in very long face detection.

On the other hand, according to the present invention, as described above, face detection is carried out only in a predetermined region including a red-eye candidate after the red-eye candidate is detected. Thus, useless face detection in a region having no red eyes is eliminated, making it possible to greatly shorten the time of face detection in red-eye detection.

There is no particular limitation on face detection methods with the face detection section 16. Various known methods may be used such as a method of detecting a face region from a target image by using an average face image pre-created from many face image samples, i.e., a template of a face (face template hereinafter), and methods described as other face candidate detection methods in JP 2000-137788 A, JP 2000-148980 A, and JP 2000-149018 A.

Here, in the detector 10, the face detection section 16 performs face detection by using face information of the previously detected face in accordance with the processing sequence of the red-eye detection, and/or changes the face detection processing conditions between the main and non-main portion regions set by the region setting section 12.

First, for the face information, the face detection section 16 includes a memory unit 20, and stores face information of a face in the memory unit 20 in accordance with the processing sequence when the face can be detected corresponding to a red-eye candidate. When face detection is carried out for a red-eye candidate of next face detection (face detection corresponding to next red-eye candidate), the face detection section 16 performs the face detection by using the face information of the face just previously detected (i.e., face lastly detected in the detector 10) that has been stored in the memory unit 20.

According to the present invention, the face detection corresponding to the next red-eye candidate includes not only face detection carried out next when there are a plurality of red-eye candidates in one image but also face detection carried out first in the next frame (image) in one case (one order). One case usually comprises the images recorded on one film or one storage medium. In one case, the face information on the face lastly detected in one frame is used during the first face detection corresponding to a red-eye candidate in the next frame. It is also possible to use the information of the face lastly detected in a certain case for the first face detection in the next case.

Specifically, when face can be detected corresponding to a red-eye candidate, information on a direction of the detected face (direction of the vertex on a photographic screen (=image surface)) and information on a size of the face are stored as the face information of the detected face in the memory unit 20. In face detection corresponding to the next red-eye candidate, the face information is read from the memory unit 20, and the face detection is first performed by using the direction and the size of the face.

Accordingly, it is possible to shorten the face detection time in addition to shortening of the processing time by first executing the red-eye candidate detection.

There are basically four directions of the face in the taken image in accordance with the orientation of the camera during the photographing, that is to say, depending on whether the camera is horizontally or vertically oriented and what position its top (or bottom) is in during the photographing, as shown in FIGS. 2A to 2D.

For convenience, a face direction of FIG. 2A is considered to be of an angle 0°, a face direction of FIG. 2B to be of an angle 90°, a face direction of FIG. 2C to be of an angle 180°, and a face direction of FIG. 2D to be of an angle 270° (omitting "face directions", hereinafter). The angles 0° and 180° correspond to the photographing with a camera in a so-called horizontal position (taken images extending horizontally). The angles 90° and 270° correspond to the photographing with a camera in a so-called vertical position (taken images extending vertically).

As described above, when face directions are different, arraying directions of eyes, nose, mouth, and the like on the screen are different. Thus, to properly detect all the faces, face detection must be performed for all the face directions.

To that end, in ordinary face detection, for example, a face template with the angle of 0° of FIG. 2A is created/stored. The face template is rotated (or a target image is rotated), and face detection operations are sequentially performed in predetermined order of face directions (e.g., order of 0°→90°→180°→270°) in target regions (corresponding to face size) of the face detection until faces are detected. In other words, the face detection is performed in four face directions at the maximum (with a face direction of 270°, and a case in which a detection target region is not a face).

There are various face sizes in the image depending on object distances or the like. When face sizes vary, distances between eyes, nose, mouth, and the like are naturally different. Accordingly, to properly detect all the faces, the face detection must be performed in accordance with various face sizes.

Figure 2E:
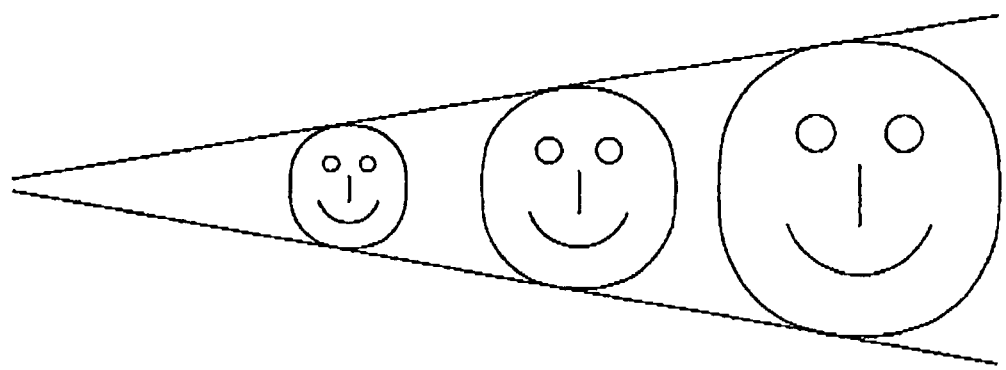

Thus, in ordinary face detection, for example, as schematically shown in FIG. 2E, a face template created/stored beforehand by resolution conversion is enlarged/reduced (or target image is enlarged/reduced), and face detection operations are sequentially performed in predetermined order of face sizes (e.g., order of standard size→large size→small size) in detection regions until faces are detected. In other words, the face detection is performed corresponding to three sizes (as above) at the maximum.

Thus, the face detection is performed corresponding to the maximum possible number of combinations of the set face directions and sizes. In the illustrated example, the face detection is performed by twelve times at the maximum.

Here, when a plurality of persons are photographed in one image, ordinarily, all the faces are the same in direction. In the case of ordinary photographing, photographing with a camera positioned upside down is quite rare. Thus, face directions in the images of one case taken in a horizontal position are normally the same. Images of one case are mostly taken by one photographer, and with the same photographer, face directions in the images taken in a vertical position are normally the same.

Furthermore, when a plurality of persons are photographed in one image, face sizes of the persons are often similar. In addition, sequential frames (images) in one case may often hold a similar scene. In other words, there is a high possibility that images of almost the same face sizes are consecutive over a plurality of frames.

That is, the face directions and sizes of the persons in one image are the same in most cases, and there is a high possibility that frames of similar face directions and sizes of the persons are consecutive in one case.

Thus, the direction and size of the previously (last) detected face are stored in the memory unit 20. When face detection corresponding to the next red-eye candidate is performed, the face detection is first performed based on the stored face direction and size. Thus, there is a high possibility that the face of a person may be detected in the first face detection. In other words, it is possible to greatly shorten the time of face detection corresponding to red-eye detection.

Description will now be made referring to conceptual diagrams of FIGS. 3A to 3C.

For example, when frames with a face direction of 180° are consecutive as schematically shown in FIG. 3A, in the conventional face detection method, as shown in FIG. 3B, the face detection is first performed at 0° in a certain frame. When the face detection at 0° fails, face detection is then performed at 90°. When the face detection at 90° similarly fails, the face detection is subsequently performed at 180°, as a result, a face can be finally detected successfully at 180°. In the next frame, similarly, face detection operations are sequentially performed at 0°, 90°, and 180°, and the face detection finally succeeds at 180°.

On the other hand, according to the present invention, as shown in FIG. 3C, face detection operations are sequentially performed at 0°, 90°, and 180° in a certain frame, and a face is detected at 180°. Here, in the detector 10, information that the face last detected has a face direction of 180° is stored in the memory unit 20. With respect to the next frame (red-eye candidate as the next target of face detection), face detection is first performed at 180° by using the information that the direction of the face previously detected is 180°. Thus, the face detection succeeds in the first trial with the above face direction. In other words, it is possible to greatly shorten the time of face detection.

Here, even when the face information is stored in this way, if a red-eye candidate is not a red eye, as in the case of the ordinary face detection, face detection must be performed for four face directions.

Here, as described above, upon ordinary photographing, it is quite rare to photograph with a camera positioned upside down. Thus, according to the present invention, when a direction of a last face successfully detected in one case is 0° (or 180°) corresponding to the photographing in a horizontal position, the face detection at 180° (or 0°) may be omitted. Accordingly, face detection needs to be performed only in three face directions, making it possible to shorten the time of stable face detection.

In the detector 10, face information to be stored is not limited to face direction information and face size information. Only one of them may be stored, or other face information regarding face detection may be used. However, because of a high possibility that face directions may be the same in one image or one case, at least the face direction information should preferably be stored.

Face detection is ordinarily performed for the above four directions in increments of 90°. However, the present invention is not limited to this, and the face detection may be performed in increments of an angle smaller than 90°. Further, face sizes are not limited to standard, small, and large sizes as above, and the face detection may be performed corresponding to finer size setting. As the detection is executed more finely, detection accuracy is increased, but the processing time becomes longer. Thus, proper determination may be made according to required productivity, accuracy, or the like.

In the above example, the face direction and face size are stored, and the face detection corresponding to the face direction and size is carried out first. However, the present invention is not limited to this.

For example, the face detection corresponding to the face information may not be performed first, or the face detection corresponding to the direction and size of the last detected face may be preferentially carried out. Alternatively, face detection may be carried out by increasing a weight on the direction and size of the last detected face.

It should be noted that, basically, information on a previously (last) detected face has only to be stored in the memory unit 20. However, the present invention is not limited to this. Instead, face information obtained earlier than the information concerned may be stored to be used for face detection.

For example, as described above, photographing with the camera positioned upside down is quite rare. Thus, if face detection succeeds at, e.g., 0°, in a previous frame in one case, this information is held, and detection at 180° may be omitted in subsequent frames.

With a plurality of images in one case, there is a high possibility that photographing has been carried out with the same camera by the same person. Accordingly, in general, face directions in the images taken in a horizontal position match with one another at, e.g., 0°, and face directions in the images taken in a vertical position match with one another at, e.g., 90°. Thus, when a red-eye candidate is a red eye, if face detection fails based on direction information of the last detected face for the red-eye candidate, face detection is further performed based on the direction of an earlier detected face that is different from the direction of the last detected face, resulting in a high possibility of successful face detection. Thus, it is possible to achieve high-speed face detection. Alternatively, in one case, for a first image, face detection may be performed for the red-eye candidate by changing the face direction and size of the face template as described above. For subsequent images, face detection may be performed based on the direction and size of the face detected in the first image.

As described above, in the present invention, for the face detection, the face template may be rotated/scaled (enlarged or reduced). Alternatively, the rotated/scaled face template may be prepared beforehand for the face detection. Otherwise, the target image may be rotated/scaled for the face detection. However, in view of a long processing time and complexity, processing of both of the face template and the target image is not advantageous. Accordingly, it is preferable that the target image is rotated/scaled while the face template is fixed, or the face template is rotated/scaled (or a rotated/scaled template is created beforehand) while the target image is fixed.

In general, a data volume of the face template is smaller, so an arithmetic operation amount and a time for image processing are accordingly reduced. For this reason, it is more advantageous to perform face detection while fixing the target image.

The face detection section 16 performs face detection under different conditions between the main and non-main portion regions set by the region setting section 12 in place of, or in addition to, the face detection by storing the face information.

For example, in the case of the image of FIG. 1D, for the red-eye candidates "d" and "e" located in the main portion region in the image center, highly accurate face detection with no erroneous detection or omission is carried out even if a processing time is long. For the red-eye candidates "a" to "c" located in the non-main portion region, face detection is carried out to execute processing at a high speed. Alternatively, a method of executing face detection only in the main portion region and not in the non-main portion region may be used.

By performing the highly accurate face detection in the main portion region and the high-speed face detection in the non-main portion region, or no face detection in the non-main portion region, as described above, in association with the effect of the red-eye candidate detection by changing the conditions between the main and non-main portion regions, the effect of the face detection by using the face information, and the like, it is possible to perform red-eye detection at a very high speed and at the same time with a high accuracy in the important main portion region.

There is no particular limitation on a difference in face detection conditions between the main and non-main portion regions. Various modes can be used.

Given as an example is a method of setting a high threshold value for the non-main portion region (or setting a low threshold value for the main portion region) to determine that the relevant region is not a face region based on the skin color level, the degree of matching with a face template, and so forth. According to this method, it is possible to execute highly accurate face extraction can be executed in the main portion region, and shorten a face detection time in the non-main portion region.

Additionally, in matching with a face template, a method is suitably used, which carries out face detection corresponding to all the face sizes in the main portion region, and face detection only corresponding to specified face size or sizes, e.g., a standard face size, or a standard face size and larger ones, in the non-main portion region.

A method is also suitably used, which, in combination with the storing of the face information, carries out face detection in the main portion region first in accordance with the face information stored in the memory unit 20, then for all the face directions and sizes when no face is found, and caries out face detection in the non-main portion region only corresponding to the face direction and size stored in the memory unit 20.

Alternatively, face detection similar to the above may be carried out in the main portion region, and face detection may be carried out in the non-main portion region only for the direction stored as the face information and for all the face sizes. Conversely, face detection similar to the above may be carried out in the main portion region, and face detection may be carried out in the non-main portion region only for the size stored as the face information and for all the face directions.

Furthermore, in the non-main portion region, face detection may be carried out only for a face size not smaller than the face size stored in the memory unit 20. In the non-main portion region, face detection may also be carried out only for a standard face size, or only for a face size equal to or larger than a standard size.

The face detection method may suitably be changed between the main and non-main portion regions.

Given as an example is a method, which performs face detection in the main portion region based on the matching using a face template that enables highly accurate face detection, and performs face detection in the non-main portion region based on such a technique enabling processing within a short time as the shape recognition by skin color extraction or edge extraction disclosed in JP 8-184925 A and JP 9-138471 A, and the skin color extraction. Alternatively, in the non-main portion region, the face detection may be carried out only based on the shape recognition by edge extraction, or the skin color detection.

As described above, the detection result of the red-eye candidates with the red-eye candidate detection section 14, and the red-eye candidates included in the regions of the faces detected by the face detection section 16 are fed to the red-eye specifying section 18.

By using such information, the red-eye specifying section 18 specifies the red-eye candidates around which the faces are detected as red eyes, and feeds positional information of the red eyes, information of a red-eye region, information of the number of red eyes, or the like to the red-eye correction section 22 as red-eye detection result in the target image.

In accordance with the red-eye detection result fed from the red-eye specifying section 18, the red-eye correction section 22 executes image processing of the red-eye region of the target image to correct the red eyes of the target image.

There is no particular limitation on red-eye correction methods, and various known methods may be used. Given as examples are a correction process of correcting a red eye by controlling chroma, brightness, hue, or the like of a red-eye region in accordance with an image feature amount or the like of the red eye and its vicinities (possibly including an area surrounding a face), and a correction process of simply converting a color of the red-eye region into black.

Next, referring to a flowchart, explanation will be given of the function of the detector 10, and the red-eye detection of the present invention will be described more in detail.

Figure 4:
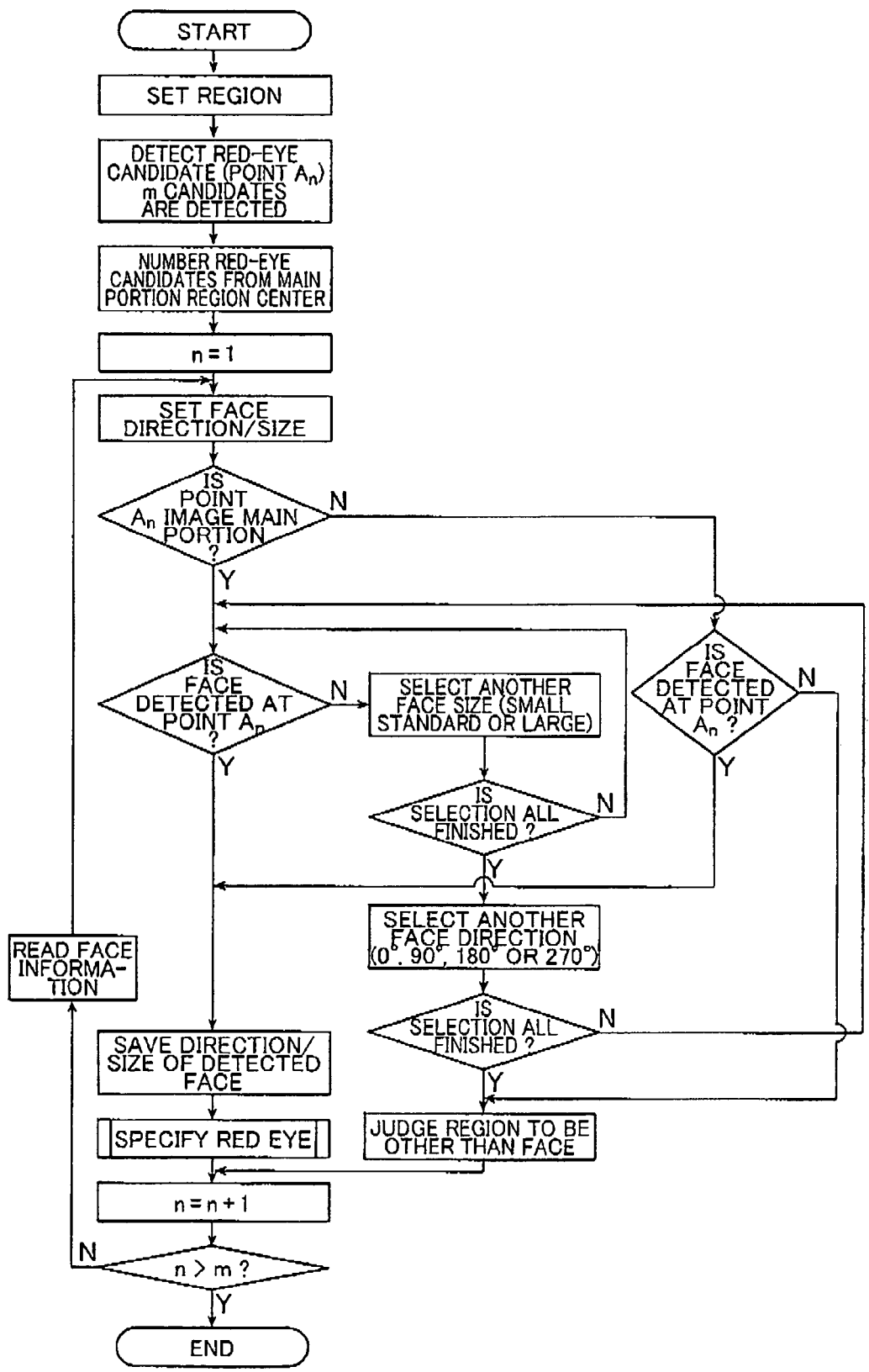
FIG. 4 is a flowchart of an example of red-eye detection according to the present invention.

FIG. 4 is a flowchart showing an example of a red-eye detection sequence in the detector 10.

In this sequence (first sequence, hereinafter), by using face information, face detection is carried out in the main portion region first in accordance with the face information. If no face is found, normal face detection is carried out in the main portion region thereafter (face detection is executed for all the face detections and sizes until a face is found). In the non-main portion region, face detection is carried out only in accordance with the stored face information.

When a target image is fed to start red-eye detection, first, the region setting section 12 sets main and non-main portion regions in the image as described above, and feeds a result of the setting to the red-eye candidate detection section 14 and the face detection section 16.

Next, the red-eye candidate detection section 14 detects red-eye candidates.

In this respect, the red-eye detection may be carried out by a normal method which does not require changing of detection conditions between the main and non-main portion regions. Alternatively, detection conditions may be changed from region to region: for example, in accordance with region setting by the region setting section 12, red-eye candidate detection is carried out by using a low threshold value in the main portion region as described above to detect even a region of a low possibility of being a red eye as a red-eye candidate region, and in the non-main portion region, red-eye candidate detection is carried out by using a high threshold value to detect only a region of a high possibility of being a red eye as a red-eye candidate region.

Naturally, the latter that changes the detection conditions from region to region is a sequence enabling processing at a higher speed (higher-speed mode). Whether or not to change the detection conditions from region to region may be selectable. Alternatively, red-eye detection modes may be set in accordance with various sequences, and the detection conditions may be selected by selecting a mode.

In this embodiment, as an example, normal red-eye detection is performed in which the detection conditions are not changed from region to region.

Assuming that the red-eye candidates (points A) being m in number, that is to say, m red-eye candidates have been detected in total, the red-eye candidate detection section 14 executes sequential numbering from point $A_1$ to point $A_m$ (point $A_n$ (n=1 to m)) starting from a red-eye candidate region $A_1$ which is nearest to the center of the main portion region and ending to a red-eye candidate region $A_m$, and sends the red-eye candidate detection result to the face detection section 16 and the red-eye specifying section 18.

The face detection section 16 reads face information from the memory unit 20, and sets a face direction and face size compliant with this face information (face information of a last detected face=face information of a face lastly detected in the detector 10) as first face detection conditions.

For example, if the face information stored in the memory unit 20 indicates that a face direction is 0° and a face size is large, these are set as conditions for first face detection. If there is no face information stored in the memory unit 20, as conditions for first face detection, most standard conditions, e.g., a face direction of 0° and standard face size, are set.

Determination is made as to whether a first (n=1) red-eye candidate (point $A_n$, i.e., $A_1$) is in a main portion region or a non-main portion region. If it is in a main portion, the face detection section 16 performs face detection at the point $A_n$ (that is, in a predetermined region including the point $A_n$) under the above face detection conditions (0° and large size) previously set.

If a face is detected at the point A ($A_n$) under these conditions, the face detection section 16 stores 0° and the large size in the memory unit 20 as face information of the detected face (or maintains the face information in the memory unit 20 as such), and the red-eye specifying section 18 specifies this red-eye candidate as a red eye.

On the other hand, if the face detection fails at the point $A_n$ under those conditions, the face detection section 16 subsequently changes the face size to perform face detection for a standard size, for example. If the face detection succeeds under those conditions, face information (0° and standard size) is similarly stored, and this red-eye candidate is specified as a red eye. On the other hand, if the face detection fails, the face size is changed again to perform face detection for a small size. Then, if the face detection succeeds, face information is similarly stored, and this red-eye candidate is specified as a red eye.

If face detection operations fail for all the face sizes ("selection is all finished" state), the face detection section 16 next changes the face direction to perform face detection at 90°, for example. It is to be noted that, hereupon, the face size is set to the initial size, the large size (i.e., face size stored in the memory unit 20), and the "selection is all finished" state for face size is reset.

If a face is detected under these conditions, the face detection section 16 similarly stores face information (90° and large size), and this red-eye candidate is specified as a red eye.

On the other hand, if the face detection fails under the conditions, the face size is changed again to perform face detection at a standard size as described above. If the face detection succeeds under this condition, the face information is similarly stored, and this red-eye candidate is specified as a red eye. If the face detection fails, the face size is changed to a small size to perform face detection. Then, if the face detection succeeds, face information is similarly stored, and this red-eye candidate is specified as a red eye.

If face detection operations fail for all the face sizes when a face direction is 90°, the face detection section 16 next changes the face direction to 180°. Thereafter, face sizes are similarly changed, and face detection operations at the point $A_n$ are sequentially performed. If the face detection succeeds, face information is stored, and the red-eye candidate is specified as a red eye. If the face detection fails for the face direction of 180° and all the face sizes, the face direction is changed to 270°. Thereafter, the face size is similarly changed for the face detection at the point $A_n$. If the face can be detected, the face information is stored, and the red-eye candidate is specified as a red-eye.

If the face detection operations fail for all the face sizes at the face direction in 270° ("selection is all finished" state), i.e., if face detection fails for every possible combination of the face directions and sizes, the region around the point $A_n$ is judged to be other than a face (that is, it is judged that the red-eye candidate is not a red eye).

Also in the case where the first (n=1) red-eye candidate being a point A (point $A_n$, i.e. $A_1$) is in a non-main portion region, the face detection is performed at the point $A_n$ first under the above face detection conditions (0° and large size) previously set.

If a face is detected at the point $A_n$ under these conditions, the face detection section 16 stores 0° and the large size in the memory unit 20 as face information of the detected face, and the red-eye specifying section 18 specifies this red-eye candidate as a red eye.

On the other hand, in the non-main portion region, if a face is not detected under those conditions, the region around this point $A_n$ is determined to be other than a face (as above).

If the point $A_n$ is specified as a red eye (i.e., if a face can be detected), and if the region around the point $A_n$ is determined to be other than a face, the number n is set to the number n+1, that is, incremented by one, and face detection is carried out for the next new point $A_n$ if the incremented new number n is not larger than m, that is, n≦m.

That is, similarly, the face information is read from the memory unit 20, the face direction and size for the first face detection operation at the point $A_n$ (new) are set in accordance with the read information, and determination is made as to whether the point $A_n$ is in a main portion region or a non-main portion region.

If the point $A_n$ is in a main portion region, similarly, face detection is carried out first under the conditions set in accordance with the face information read from the memory unit 20, and the face detection is carried out by sequentially changing the face size and the face direction until a face is detected. If a face is detected, face information thereof is stored in the memory unit 20 and the point $A_n$ is specified as a red eye. If a face is not detected, the region around the point $A_n$ is determined to be other than a face. On the other hand, if the point $A_n$ is in a non-main portion region, face detection is carried out under the conditions set in accordance with the face information read from the memory unit 20. If a face is detected, this point $A_n$ is specified as a red eye and the information of the detected face is stored. If a face is not detected, the region around the point $A_n$ is determined to be other than a face.

When the point $A_n$ is specified as a red eye, and when the region around the point $A_n$ is determined to be other than a face, the number n is set to n+1, that is, incremented by one, and thereafter similarly, face detection is carried out sequentially for the subsequent red eye candidates (new point $A_n$). When the incremented new number n has become larger than m, that is, n>m is established, i.e., face detection is finished for all the red eye candidates, the red-eye detection is finished.

By executing no face detection in the non-main portion region in the first sequence, for example, a processing sequence enabling higher-speed red-eye detection (i.e., red-eye correction) can be provided. Such a sequence can be used as a highest-speed processing mode of red-eye correction in the detector 10.

Figure 5:
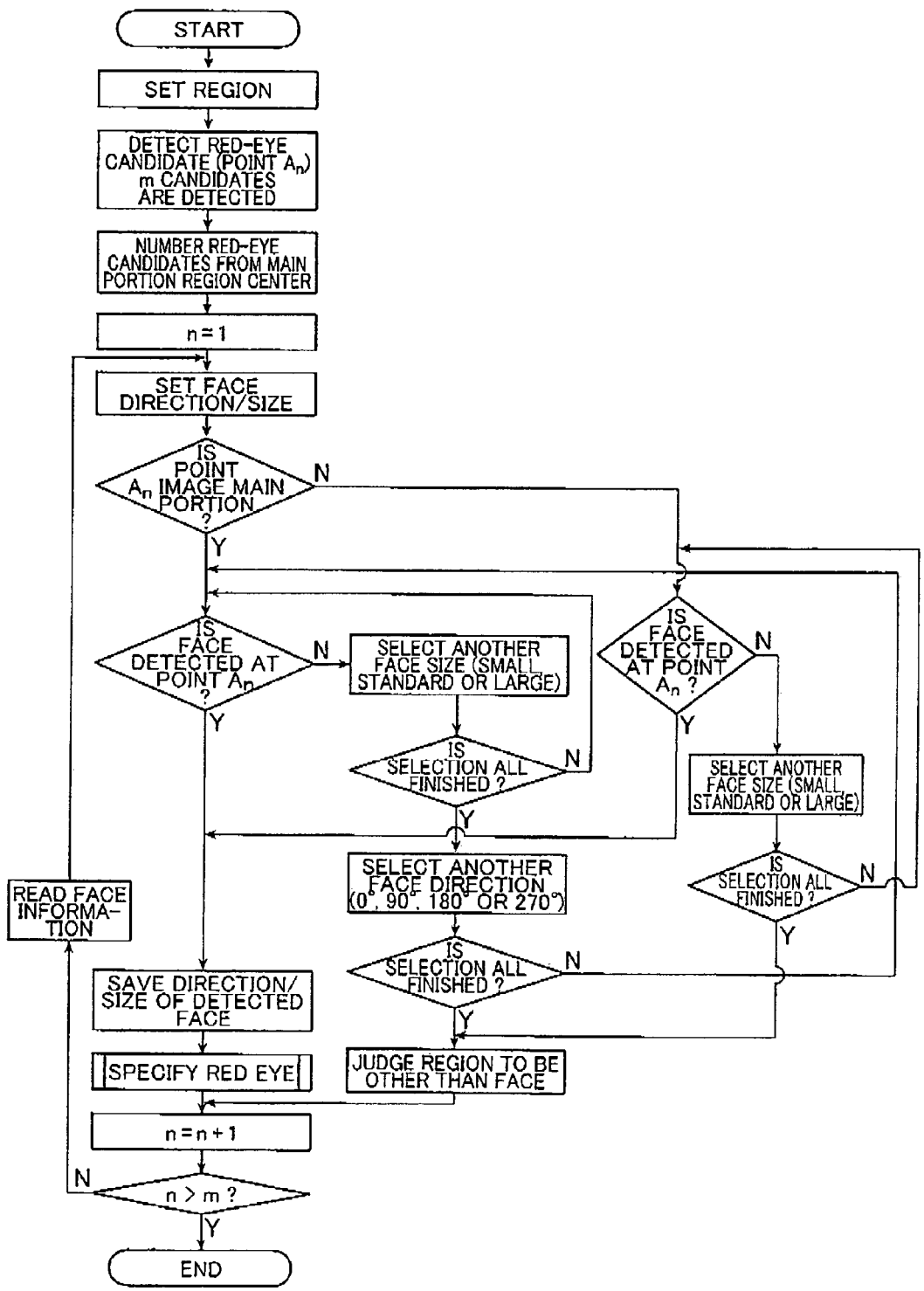
FIG. 5 is a flowchart showing another example of red-eye detection according to the present invention.

FIG. 5 is a flowchart showing another example of a red-eye detection sequence in the detector 10.

In this sequence (second sequence hereinafter), as in the case of the first sequence, face detection is carried out in the main portion region first in accordance with the stored face information. If no face is found, normal face detection is carried out thereafter. In the non-main portion region, face detection is carried out only in accordance with the stored face information regarding a face direction and for all the sizes regarding a face size.

In the second sequence, as in the case of the first sequence, region setting→red-eye candidate detection→numbering of red-eye candidates→setting of face direction and face size for face detection in accordance with face information→determination as to whether point $A_n$ (each of $A_1$ to $A_m$) is in a main portion region or a non-main portion region are sequentially performed.

If a first (n=1) red-eye candidate being a point A (point $A_n$, i.e. $A_1$) is in a main portion region, the face detection section 16 performs face detection in the main portion region as in the case of the first sequence.

That is, face detection is carried out at the point $A_n$ first under conditions set in accordance with the face information read from the memory unit 20. If a face is not detected under these conditions, face detection is executed first by changing the face size. If a face is not detected for all the sizes, a process of sequentially changing the face direction and carrying out face detection again for each size is performed.

At a point of time of detecting a face, face information of the detected face is stored in the memory unit 20, and the red-eye specifying section 18 specifies this red-eye candidate as a red eye. On the other hand, if no face is detected for any combination of the face directions and sizes, the region around this point $A_n$ is determined to be other than a face.

Also in the case where a first red-eye candidate is in a non-main portion region, face detection is carried out at the point $A_n$ first under the conditions (e.g., 0° and large size) set in accordance with the face information read from the memory unit 20.

If a face is detected at the point $A_n$ under these conditions, the face detection section 16 similarly stores these conditions in the memory unit 20 as face information (0° and large size) at the point $A_n$, and the red-eye specifying section 18 specifies the red-eye candidate as a red eye.

If a face is not detected under these conditions, in the second sequence, the face size is changed, and face detection is carried out for a standard size, for example. If a face is detected under these conditions, the face information (0° and standard size) is stored in the memory unit 20, and this red-eye candidate is specified as a red eye in the same manner. If a face is not detected under those conditions, the face size is changed again and face detection is carried out for a small size. If a face is detected, its face information is stored and this red-eye candidate is specified as a red eye in the same manner.

In the non-main portion region, if no face is detected for all face sizes ("selection is all finished" state), the face detection section 16 determines the region around the point $A_n$ to be other than a face. In other words, in the second sequence, the face detection in the non-main portion region is carried out corresponding to various sizes regarding a face size, but only for one direction regarding a face direction.

When the point $A_n$ is specified as a red eye, and when the region around the point $A_n$ is determined to be other than a face, the number n is set to the number n+1, that is, incremented by one, and face detection is similarly carried out for the next new point $A_n$ if the incremented new number n is not larger than m, that is, n≦m is established, as in the case of the first sequence.

That is, the face information is read from the memory unit 20, and the face direction and face size for the first face detection operation at the point $A_n$ are set according thereto, and further, determination is made as to whether the point $A_n$ is in a main portion region or a non-main portion region. Thus, the face detection is similarly carried out in accordance with the region. If the face could be detected, the point $A_n$ is specified as a red eye and the face information is stored, and alternatively, if the face could not be detected, the region around the point $A_n$ is determined to be other than a face. Next, the number n is set to n+1, that is, incremented by one, and similarly thereafter, face detection is carried out sequentially for the subsequent red eye candidates (new point $A_n$). When the incremented new number n has become larger than m, that is, n>m is established, i.e., face detection is finished for all the red eye candidates, the red-eye detection is finished.

According to the second sequence, in the non-main portion region, the face detection is carried out in accordance with all the face sizes. However, in the sequence that changes only the face size, other various modes can be employed for face detection in the non-main portion region.

For example, the face detection in the non-main portion region may be carried out only for the face size stored in the memory unit 20 and larger. In other words, if the face size stored in the memory unit 20 is a standard size, face detection is carried out only for the standard size and a large size. If the stored face size is a large size, face detection is carried out only for the large size.

Alternatively, the face detection in the non-main portion region may be carried out only for not the face size stored in the memory unit 20 but a preset face size and larger. In other words, if the set face size is a standard size, face detection is carried out only for the standard size and a large size.

The face in the non-main portion region may not be a main object in most cases if it is fairly small. Even if a red eye occurs in a small face in the non-main portion region, it causes no product quality problem in most cases. Thus, by employing such a sequence, it is possible to perform higher-speed processing.

Figure 6:
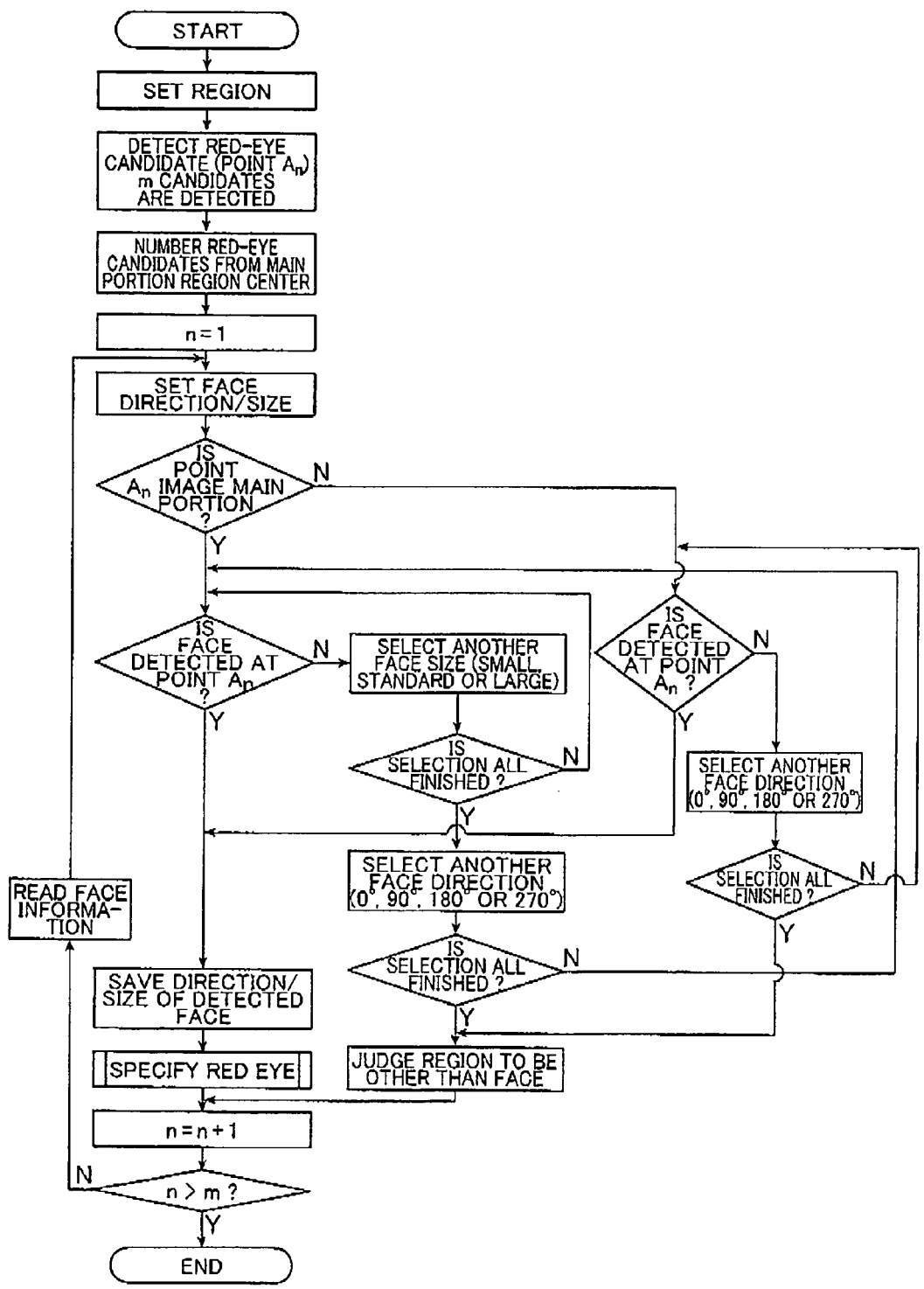
FIG. 6 is a flowchart showing still another example of red-eye detection according to the present invention.

FIG. 6 is a flowchart showing another example of a red-eye detection sequence in the detector 10.

In this sequence (third sequence hereinafter), as in the case of the first sequence, face detection is carried out in the main portion region first in accordance with the face information. If no face is found, normal face detection is carried out thereafter. In the non-main portion region, face detection is carried out only in accordance with the stored face information regarding a face size but for all the directions regarding a face direction.

In the third sequence, as in the case of the first sequence, region setting→red-eye candidate detection→numbering of red-eye candidates→setting of face direction and face size for face detection in accordance with face information→determination as to whether point $A_n$ (each of $A_1$ to $A_m$) is in a main portion region or non-main portion region are sequentially performed.

If a first (n=1) red-eye candidate being a point A (point $A_n$, i.e. $A_1$) is in a main portion region, the face detection section 16 performs face detection as in the case of the first sequence.

That is, face detection is carried out at the point $A_n$ first under conditions set in accordance with the face information read from the memory unit 20. If a face is not detected under these conditions, face detection is executed first by changing the face size. If a face is not detected for all the sizes, a process of sequentially changing the face direction and carrying out face detection again for each size is performed.

At a point of time of detecting a face, face information of the detected face is stored in the memory unit 20, and the red-eye specifying section 18 specifies this red-eye candidate as a red eye. On the other hand, if no face is detected for any combination of the face directions and sizes, the region around this point $A_n$ is determined to be other than a face.

Also in the case where a first red-eye candidate is in a non-main portion region, face detection is carried out at the point $A_n$ first under the conditions (e.g., 0° and large size) set in accordance with the face information read from the memory unit 20.

If a face is detected at the point $A_n$ under these conditions, the face detection section 16 similarly stores these conditions in the memory unit 20 as face information (0° and large size) at the point $A_n$, and the red-eye specifying section 18 specifies the red-eye candidate as a red eye.

If a face is not detected under these conditions, in the third sequence, the face direction is changed, and face detection is carried out for, e.g., 90°. If a face is detected, the face information (90° and large size) is stored, and this red-eye candidate is specified as a red eye in the same manner. If no face is detected under these conditions, the face direction is changed again, and face detection is carried out sequentially for 180° and 270°. When a face is detected, its face information is stored, and this red-eye candidate is specified as a red eye.

In the non-main portion region, if no face is detected for all the face directions ("selection is all finished" state), the face detection section 16 determines the region around the point $A_n$ to be other than a face. In other words, in the third sequence, the face detection in the non-main portion region is carried out in accordance with various directions regarding a face direction, but for only one size regarding a face size.

When the point $A_n$ is specified as a red eye, and when the region around the point $A_n$ is determined to be other than a face, the number n is set to the number n+1, that is, incremented by one, and face detection is similarly carried out for the next new point $A_n$ if the incremented new number n is not larger than m, that is, n≦m is established, as in the case of the first sequence.

That is, the face information is read from the memory unit 20, and the face direction and face size for the first face detection operation at the point $A_n$ are set according thereto, and further, determination is made as to whether the point $A_n$ is in a main portion region or a non-main portion region. Thus, the face detection is similarly carried out in accordance with the region. If the face could be detected, the point $A_n$ is specified as a red eye and the face information is stored, and alternatively, if the face could not be detected, the region around the point $A_n$ is determined to be other than a face. Next, the number n is set to n+1, that is, incremented by one, and similarly thereafter, face detection is carried out sequentially for the subsequent red eye candidates (new point $A_n$). When the incremented new number n has become larger than m, that is, n>m is established, i.e., face detection is finished for all the red eye candidates, the red-eye detection is finished.

Figure 7:
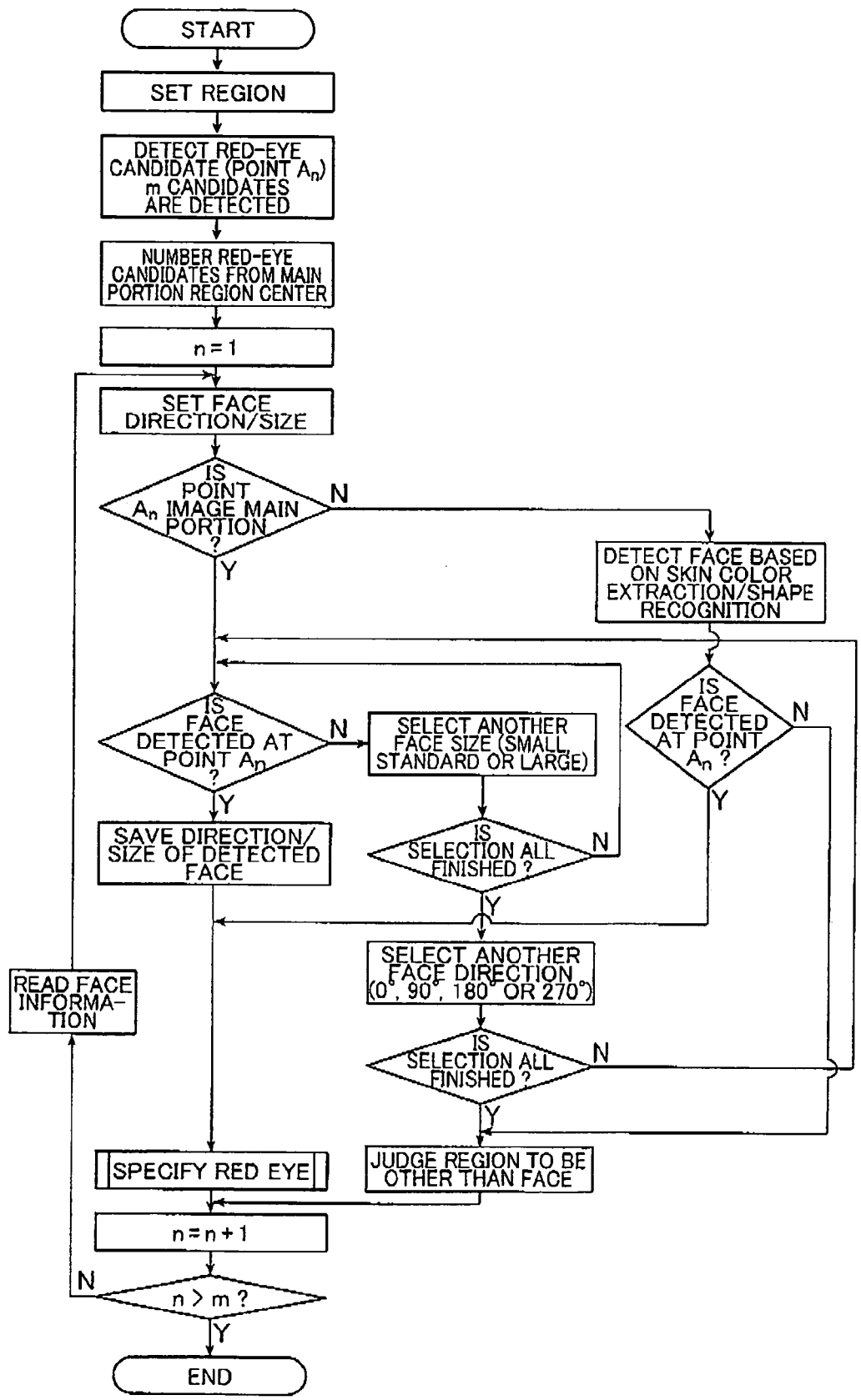
FIG. 7 is a flowchart showing yet another example of red-eye detection according to the present invention.

FIG. 7 is a flowchart showing yet another example of a red-eye detection sequence in the detector 10.

In this sequence (fourth sequence hereinafter), as in the case of the first sequence, face detection is carried out in the main portion region first in accordance with the face information. If no face is found, normal face detection is carried out thereafter. In the non-main portion region, face detection is carried out not based on the matching using a face template but based on the skin color extraction/shape recognition enabling high-speed processing.

In the fourth sequence, as in the case of the first sequence, region setting→red-eye candidate detection→numbering of red-eye candidates→setting of face direction and face size for face detection in accordance with face information →determination as to whether point $A_n$ (each of $A_1$ to $A_m$) is in a main portion region or non-main portion region are sequentially performed.

If a first (n=1) red-eye candidate being a point A (point $A_n$, i.e. $A_1$) is in a main portion region, the face detection section 16 performs face detection as in the case of the first sequence.

That is, face detection is carried out at the point $A_n$ first under conditions set in accordance with the face information read from the memory unit 20. If a face is not detected under these conditions, face detection is executed first by changing the face size. If a face is not detected for all the sizes, a process of sequentially changing the face direction and carrying out face detection again for each size is performed.

At a point of time of detecting a face, face information of the detected face is stored in the memory unit 20, and the red-eye specifying section 18 specifies this red-eye candidate as a red eye. On the other hand, if no face is detected for any combination of the face directions and sizes, the region around this point $A_n$ is determined to be other than a face.

On the other hand, if the point $A_n$ is in a non-main portion region, the face detection section 16 performs face detection based on the skin color extraction and shape recognition around the point $A_n$ irrespective of the stored face information. If a face is detected at the point $A_n$, the red-eye specifying section 18 specifies this red-eye candidate as a red eye. If no face is detected at the point $A_n$, the region around the point $A_n$ is determined to be other than a face.

When the point $A_n$ is specified as a red eye, and when the region around the point $A_n$ is determined to be other than a face, the number n is set to the number n+1, that is, incremented by one, and face detection is similarly carried out for the next new point $A_n$ if the incremented new number n is not larger than m, that is, n≦m is established, as in the case of the first sequence.

That is, the face information is read from the memory unit 20, and the face direction and face size for the first face detection operation at the point $A_n$ are set according thereto, and further, determination is made as to whether the point $A_n$ is in a main portion region or a non-main portion region. Thus, the face detection is similarly carried out in accordance with the region. If the face could be detected, the point $A_n$ is specified as a red eye and the face information is stored, and alternatively, if the face could not be detected, the region around the point $A_n$ is determined to be other than a face. Next, the number n is set to n+1, that is, incremented by one, and similarly thereafter, face detection is carried out sequentially for the subsequent red eye candidates (new point $A_n$). When the incremented new number n has become larger than m, that is, n>m is established, i.e., face detection is finished for all the red eye candidates, the red-eye detection is finished.

In all the sequences described above, the numbering is carried out starting from the red-eye candidate in the center of the main portion region, and the face detection is carried out in order of the numbers. Thus, after the end of the face detection in the main portion region, the face detection is carried out in the non-main portion region.

According to the present invention, by utilizing such processes, the face detection result in the main portion region may be subjected to statistical processing, and the face detection conditions in the non-main portion region may be changed in accordance with variances in face directions and sizes in the main portion region.

Figure 8:
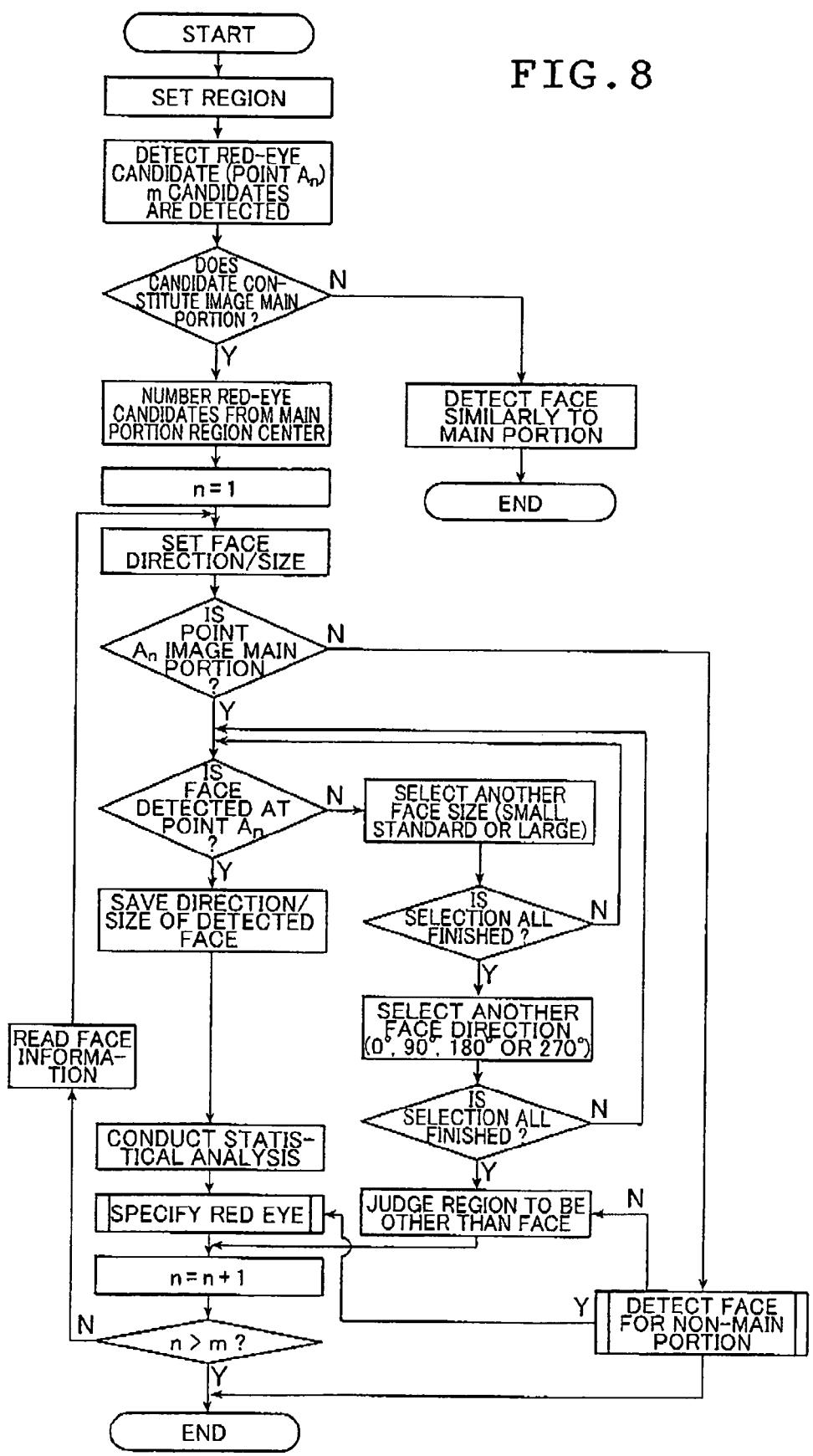
FIG. 8 is a flowchart showing a further example of red-eye detection according to the present invention.
Figure 9:
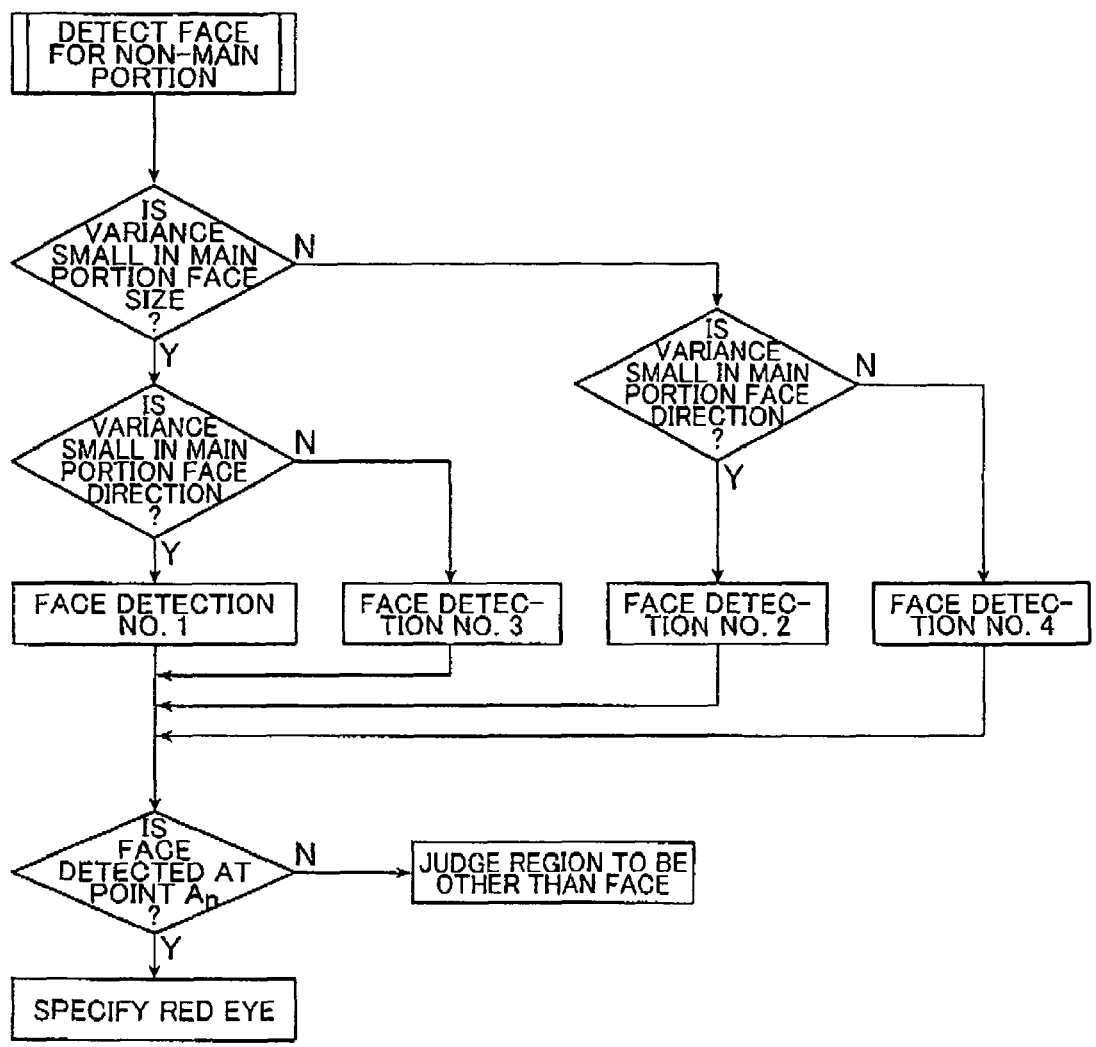
FIG. 9 is a detailed flowchart showing a part of the flowchart of FIG. 8.

FIGS. 8 and 9 are flowcharts showing a sequence of such red-eye detection processing (fifth sequence hereinafter).

In the fifth sequence, as shown in FIG. 8, region setting→red-eye candidate detection are performed as in the case of the first sequence.

Next, in the fifth sequence, in accordance with the result of red-eye candidate detection, determination is made as to whether the red-eye candidate constitutes a main portion or not (whether a red-eye candidate is present or not in the main portion region). As a result, if the red-eye candidate does not constitute a main portion, without distinguishing between the main and non-main portion regions, face detection is carried out in all the regions of the image as in the case of the face detection in the main portion region that will be described later (face detection similar to that in the main portion region in the first sequence or the like). In this respect, analysis processing is unnecessary.

If the red-eye candidate constitutes a main portion, next, completely as in the case of the first sequence, numbering of red-eye candidates→setting of face direction and size in accordance with face information→determination as to whether point $A_n$, is in a main portion region or non-main portion region are sequentially carried out.

In this sequence, as described above, upon confirmation that the red-eye candidate constitutes a main portion, the numbering of red-eye candidates is carried out from the center of the main portion region. Thus, first, as shown in FIG. 8, face detection corresponding to the red-eye candidates in the main portion region is carried out as in the case of the first sequence.

That is, face detection is carried out at the point $A_n$ first under conditions set in accordance with the face information read from the memory unit 20. If a face is not detected under these conditions, face detection is executed first by changing the face size. If a face is not detected for all the sizes, a process of sequentially changing the face direction and carrying out face detection again for each size is performed.

At a point of time of detecting a face, face information of the detected face is stored in the memory unit 20, and the red-eye specifying section 18 specifies this red-eye candidate as a red eye. On the other hand, if no face is detected for any combination of the face directions and sizes, the region around this point $A_n$ is determined to be other than a face.

When the point $A_n$ is specified as a red eye, and when the region around the point $A_n$ is determined to be other than a face, the number n is set to the number n+1, that is, incremented by one, and face detection is similarly carried out for the next new point $A_n$ if the incremented new number n is not larger than m, that is, n≦m is established, as in the case of the first sequence.

That is, the face information is read from the memory unit 20, and the face direction and face size for the first face detection operation at the point $A_n$ are set according thereto to carry out the face detection. If the face could be detected, the point $A_n$ is specified as a red eye and the face information is stored, and alternatively, if the face could not be detected, the region around the point $A_n$ is determined to be other than a face. Next, the number n is set to n+1, that is, incremented by one, and similarly thereafter, the face detection is carried out sequentially.

In the fifth sequence, in the main portion region, each time a face can be detected, statistical analysis processing for a face direction and a face size is carried out. Variances on face directions and face sizes in the main portion region are analyzed.

Upon the end of the face detection for all the red-eye candidates in the main portion region, determination in the step "IS POINT $A_n$ IMAGE MAIN PORTION?" becomes "NO", the process then enters a sequence of non-main portion face detection shown in FIG. 9.

In the face detection in the non-main portion region, first, in accordance with statistics of the face detection result in the main portion region, determination is made as to whether a variance in face sizes is small or not, and then determination is made as to a variance in face directions.

If it is determined that variances in face sizes and face directions in the main portion region are both small, first face detection (face detection No. 1) is carried out for the red-eye candidates in the non-main portion region. According to the first face detection, face detection is carried out only according to the face direction and size stored in the memory unit 20. In other words, it is similar to the face detection in the non-main portion region in the first sequence.

If a variance in face sizes is small in the main portion region while a variance in face directions is large, third face detection (face detection No. 3) is carried out for the red-eye candidates in the non-main portion region. According to the third face detection, face detection is carried out only according to the face size stored in the memory unit 20 regarding a face size and, at the same time, carried out by changing the face direction until a face is detected. In other words, it is similar to the face detection in the non-main portion region in the third sequence.

If a variance in face sizes is large in the main portion region while a variance in face directions is small, second face detection (face detection No. 2) is carried out for the red-eye candidates in the non-main portion region. According to the second face detection, face detection is carried out only according to the face direction stored in the memory unit 20 regarding a face direction and, at the same time, carried out by changing the face size until a face is detected. In other words, it is similar to the face detection in the non-main portion region in the second sequence.

If variances in face sizes and directions are both large, fourth face detection (face detection No. 4) is carried out for the red-eye candidates in the non-main portion region. According to the fourth face detection, face detection is carried out for a combination of all the face directions and sizes until a face is detected. In other words, it is similar to the face detection in the main portion region.

Thus, the face detection is carried out for the red-eye candidates in the non-main portion region in accordance with the variances in face sizes and directions. When the point $A_n$ is specified as a red eye, and when the region around the point $A_n$ is determined to be other than a face, the number n is set to n+1, that is, incremented by one, and similarly thereafter, face detection is carried out sequentially. When the incremented new number n has become larger than m, that is, n>m is established, i.e., when the face detection is finished for all the red eye candidates, the red-eye detection is finished.

According to the fifth sequence which changes the face detection conditions in the non-main portion region in accordance with the variance in face sizes and directions upon the face detection in the main portion region, face detection can be performed at the highest possible speed in accordance with the state of the main portion region without reducing accuracy of the face detection in the non-main portion region.

In all the sequences described above, information on the last detected face is used, and the detection conditions are changed between the main and non-main portion regions. In the detector 10, in addition to the above-described sequences, red-eye detection may be performed by a red-eye detection sequence for executing similar face detection by using stored face information in all regions without distinguishing between the main and non-main portion regions (sixth sequence hereinafter) or a red-eye detection sequence for executing face detection by changing the conditions between the main and non-main portion regions without using the face information stored in the memory unit 20 (seventh sequence hereinafter).

Figure 10:
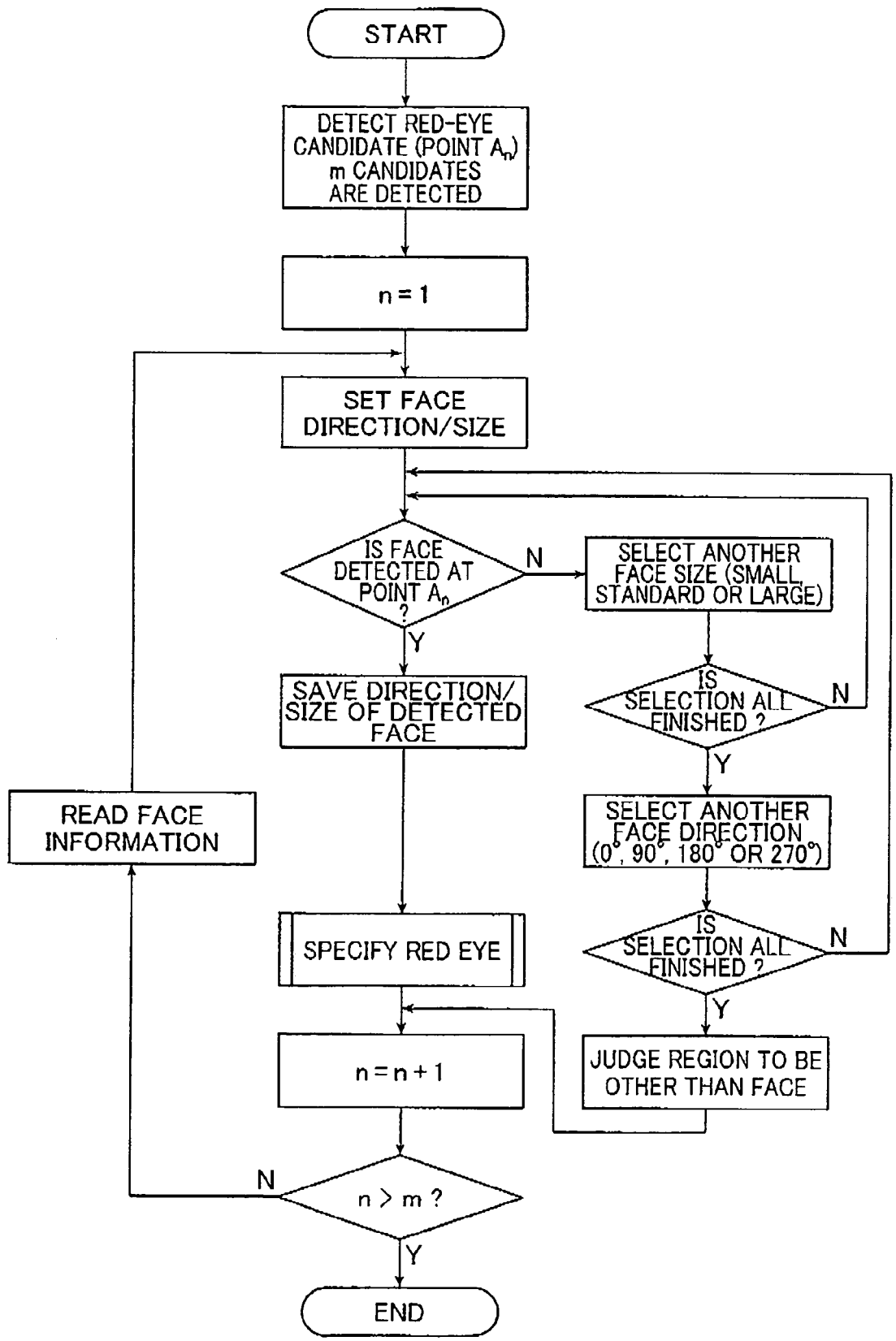
FIG. 10 is a flowchart showing another example of red-eye detection according to the present invention.

FIG. 10 shows a flowchart of the sixth sequence.

In this sequence, similar face detection is carried out by using the face information stored in the memory unit 20 in all the image regions without distinguishing between the main and non-main portion regions of the image.

When a target image is fed to start red-eye detection, the red-eye detection section 14 first detects red-eye candidates from the target image without the setting of regions. Assuming that the red-eye candidates detected are m in number, numbering is carried out for the red-eye candidates (not necessarily from the image center).

Thereafter, as in the case of the face detection in the main portion region in the first sequence or the like, face detection is carried out by using the face information. If no face is detected, by sequentially changing the face size and direction, face detection is performed sequentially on the individual red-eye candidates starting from a first (n=1) red-eye candidate being a point A (point $A_n$, i.e. $A_1$), and specifying of red eyes and storing of face information, or determination of a region other than a face, and the like are carried out. Next, the number n is set to n+1, that is, incremented by one, and similarly thereafter, face detection is carried out sequentially. When the incremented new number n has become larger than m, that is, n>m is established, i.e., when the face detection is finished for all the red eye candidates, the red-eye detection is finished.

Figure 11:
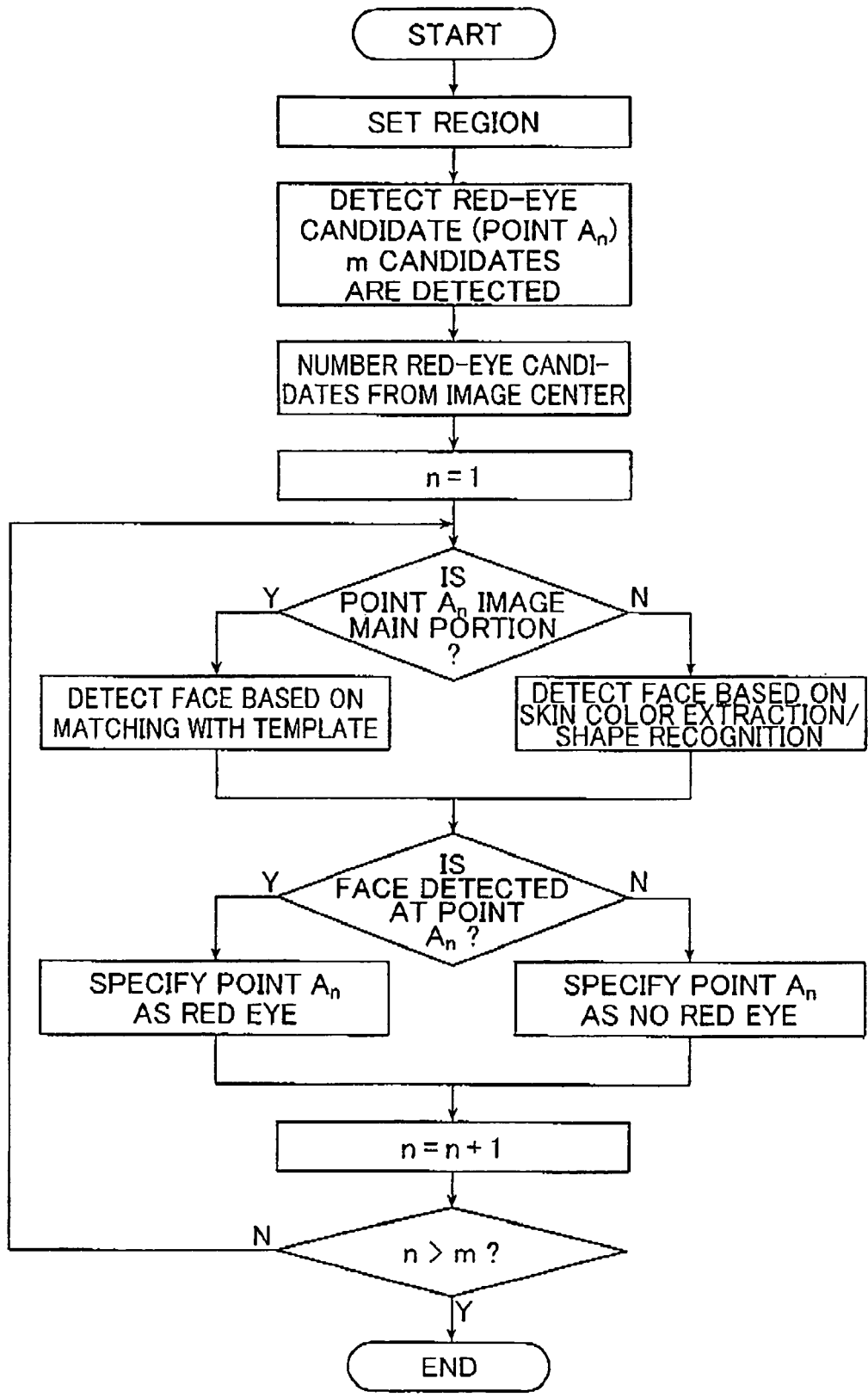
FIG. 11 is a flowchart showing yet another example of red-eye detection according to the present invention.

FIG. 11 shows a flowchart of the seventh sequence.

In the seventh sequence, face detection is carried out under conditions different between the main and non-main portion regions of the image without using the face information.

In the seventh sequence, as in the case of the first sequence, region setting→red-eye candidate detection→numbering of red-eye candidates are carried out. According to this sequence, since the face information is not used, setting of a face direction and a face size is not executed in accordance with the face information, and determination is made as to whether the point $A_n$ is in a main portion region or a non-main portion region.

When the red-eye candidate is in a main portion region, the face detection section 16 carries out face detection based on the matching using a face template enabling highly accurate face detection, i.e., face detection similar to that in the main portion region in the first sequence or the like except that the face information is not used. If the red-eye candidate is in a non-main portion region, face detection is carried out based on the skin color extraction and the shape recognition by edge extraction enabling high-speed processing. Then, the face detection section 16 sends information as to whether a face is detected or not around the point $A_n$ to the red-eye specifying section 18.

In accordance with a result of the face detection, the red-eye specifying section 18 specifies the red-eye candidate as a red eye when a face is detected in the point $A_n$, and as no red eye when no face is detected in the point $A_n$.

Upon the end of specifying the point $A_n$ as a red eye or no red eye, the number n is set to the number n+1, that is, incremented by one. If the incremented new number n is not larger than m, that is, in the case of n≦m, face detection is carried out for the next new point $A_n$ (red-eye candidate). Thereafter, similarly, face detection is carried out sequentially for the subsequent red-eye candidates. When the incremented new number n has become larger than m, that is, n>m is established, i.e., when the face detection is finished for all the red-eye candidates, the red-eye detection is finished.

It is to be noted that the present invention is not limited to storage of both of the face direction and the face size as face information as described above.

In the case of storing only the face direction, for example, if no face is detected by first face detection, while the face direction is maintained intact, face sizes are changed in the order decided by default, and face detection is carried out until a face is detected. If no face is detected for all the face sizes with the stored face direction, sequential face detection may be carried out thereafter by changing the face direction as in the embodiments described before.

In the case of storing only the face size, for example, if no face is detected by first face detection, while the face size is maintained intact, the face directions are changed in the order decided by default, and face detection is carried out until a face is detected. When no face is detected for all the face directions with the stored face size, sequential face detection may be carried out thereafter by changing the face size as in the embodiments described before.

The detector 10 of the present invention may include at least one of the first to fifth sequences.

Preferably, however, the detector 10 includes two or more of the first to fifth sequences, more preferably two or more of the first to fifth sequences and the sixth sequence and/or the seventh sequence, and these sequences are preferably made selectable as red-eye processing modes.

For example, in the sixth sequence, irrespective of regions, highly accurate face detection is carried out in all the regions based on the matching with the face template corresponding to all the face directions and sizes. Accordingly, this sequence can be used as a highly accurate mode of performing highly accurate face detection while a processing time is long.

On the other hand, in the first sequence, highly accurate face detection is carried out in the main portion region, but face detection is carried out in the non-main portion region only in accordance with the stored face information. Thus, high-speed processing can be carried out. Accordingly, this sequence can be used as a high-speed mode.

In the above embodiments, the red-eye candidate detection section 14 and the face detection section 16 (red-eye candidate detection and face detection) perform red-eye candidate detection and face detection, respectively, in accordance with the same main and non-main portion regions.

However, the present invention is not limited to such. Main and non-main portion regions may be so set as to be different in position or size between the red-eye candidate detection section 14 and the face detection section 16.

For example, in the red-eye candidate detection section 14, by using a template shown in FIG. 1(B) or 1(C), red-eye candidate detection is carried out in the image center as a main portion region, or red-eye candidate detection is carried out in all the image regions under the same conditions without setting any main portion region or non-main portion region.

Figure 12:
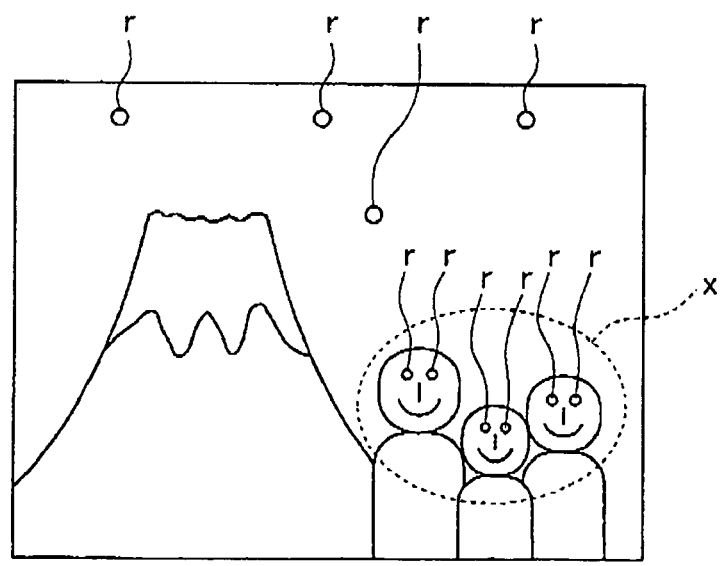
FIG. 12 is a conceptual diagram showing another example of a method of setting main portion and non-main portion regions in the present invention.

Next, in accordance with a detection result of red-eye candidates, as shown in FIG. 12, a region in which the red-eye candidates r concentrate is detected, a region x including this candidate-concentrating region is set as a main portion region, and other regions are set as non-main potion regions. By using the main and non-main portion regions thus set, the face detection section 16 changes the conditions between the main and non-main portion regions and carries out face detection, as in each of the sequences as above.

In this respect, for example, the red-eye candidate detection section 14 may feed the red-eye candidate detection result to the region setting section 12, and the region setting section 12 may set a circular, elliptical, or rectangular region including the candidate-concentrating region as a main portion region.

The method and the apparatus for detecting particular regions, and the program of the present invention have been described above in detail. However, the embodiments are in no way limitative of the present invention, and needless to say, various improvements and modifications can be made without departing from the gist of the present invention.

For example, in the above embodiments, the detection method of the present invention is applied to the red-eye detection. However, the present invention is not limited to this, and various objects likely to be present in a face region of an image such as eyes, eye corners, eyebrows, a mouth, a nose, glasses, pimples, moles, and wrinkles may be set as particular regions. For example, pimple candidates may be detected from the image, face detection may be performed in a region around the pimple candidates, and pimple candidates around which a face is detected may be specified as pimples.

As a detection method of the particular region candidates in this case, for example, a known method may be employed such as a method of detecting a region having a color or a shape intrinsic to a detection target particular region from an image or a method of performing matching by using a template created by learning from many image samples of detection target particular regions.

What is claimed is:

1. A method of detecting particular regions, comprising:
    setting a main portion region and non-main portion regions other than the main portion region in an image;
    detecting particular region candidates in said image based on a first detection condition by using a computer;
    performing face detection in a region including one of the detected particular region candidates based on a second detection condition by using said computer; and
    specifying as a particular region of a detection target said particular region candidate that is included in said region where a face can be detected;
    wherein at least one of the first detection condition and the second detection condition is changed between the main portion region and the non-main portion regions of said image,
    face information regarding said face detected in said region including said particular region candidate is stored, and
    said face detection corresponding to a particular region candidate to be next subjected to said face detection is performed using the stored face information.

2. The method of detecting particular regions according to claim 1, wherein said particular regions include a region of a red eye or a golden eye.

3. The method of detecting particular regions according to claim 1, wherein said main portion region is an image center region which is previously determined.

4. The method of detecting particular regions according to claim 1, wherein a region in which said particular region candidates concentrate is set as said main portion region during said face detection.

5. The method of detecting particular regions according to claim 1, wherein said particular region candidate to be next subjected to said face detection is at least one of a particular region candidate to be next subjected to said face detection in said image and a particular region candidate to be first subjected to face detection in a next image.

6. The method of detecting particular regions according to claim 1, wherein said face information is information regarding face direction, and said face detection corresponding to said particular region candidate to be next subjected to said face detection is performed initially for said face direction stored.

7. The method of detecting particular regions according to claim 1, wherein said face information is information regarding face size, and said face detection corresponding to said particular region candidate to be next subjected to said face detection is performed initially for said face size stored.

8. The method according to claim 1, wherein the first detection condition comprises lower threshold values and higher threshold values to determine a degree of color and a degree of circularity of the detected particular region candidate and wherein detecting the particular region candidates comprises:
    detecting the particular region candidates in the main portion region based on the lower threshold values; and
    detecting the particular region candidates in the non main portion regions based on the higher threshold values.

9. The method according to claim 8, wherein the second detection condition comprises a lower threshold value and a higher threshold value to determine a skin color level and wherein performing the face detection in the region including the detected particular region candidates comprises:
    performing the face detection in the main portion region based on the lower threshold values; and
    performing the face detection in the non main portion regions based on the higher threshold values.

10. The method according to claim 8, wherein the second detection condition comprises a lower threshold value and a higher threshold value to determine a degree of matching of the detected face to a predetermined template and wherein performing the face detection in the region including the detected particular region candidates comprises:
    performing the face detection in the main portion region based on the lower threshold value; and
    performing the face detection in the non main portion regions based on the higher threshold value.

11. The method according to claim 1, further comprising:
    setting as the main portion region a region in which a luminance of the image is higher than a predetermined threshold; and
    setting as the non main portion regions a region in which the luminance of the image is less than or equal to the predetermined threshold.

12. The method according to claim 1, further comprising:
    determining a region of the image in which the detected particular region candidates are concentrated prior to performing the face detection; and
    setting the main portion region as the region in which the detected particular region candidates are concentrated and a remaining portion of the image as the non main portion regions, subsequent to detecting the particular region candidates and prior to performing the face detection.

13. An apparatus for detecting particular regions, comprising:
    region setting means for setting a main portion region and non-main portion regions other than the main portion region in an image;
    particular region candidate detection means for detecting particular region candidates from said image using fed image data of said image based on a first detection condition;
    face detection means for performing face detection in a region including one of said particular region candidates detected by said particular region candidate detection means based on a second detection condition;

specifying means for specifying as a particular region of a detection target said particular region candidate that is included in said region where a face can be detected by said face detection means; and storing means for storing face information regarding said face detected in said region including said particular region candidate by said face detection means, wherein at least one of said particular region candidate detection means and said face detection means changes corresponding first detection condition and second detection condition between the main portion region and the non-main portion regions of said image, and said face detection means reads said face information from said storing means and uses the read face information to perform said face detection corresponding to a particular region candidate to be next subjected to said face detection.

14. The apparatus for detecting particular regions according to claim 13, wherein said particular regions include a region of a red eye or a golden eye.

15. The apparatus for detecting particular regions according to claim 13, wherein said face detection means has:

a first face detection mode in which said face detection means performs said face detection by changing said detection conditions of said detection target between said main and non-main portion regions of said image and, in addition, reading said face information from said storing means for use in said face detection when performing said face detection corresponding to said particular region candidate to be next subjected to face detection;

a second face detection mode in which said face detection means performs said face detection without distinguishing between said main and non-main portion regions of said image, and by reading said face information from said storing means for use in said face detection when performing said face detection corresponding to said particular region candidate to be next subjected to said face detection; and a third face detection mode in which said face detection means performs said face detection using no face information stored, and by changing said detection conditions between said main and non-main portion regions of said image, and wherein said face detection means selects one of said first, second and third face detection modes to perform said face detection in accordance with input instruction.

16. A computer-readable medium storing a program, which, when executed by a computer, causes the computer to execute:

a region setting step of setting a main portion region and non-main portion regions other than the main portion region in an image;

a particular region candidate detection step of detecting particular region candidates from said image using fed image data of said image based on a first detection condition;

a face detection step of performing face detection in a region including one of said particular region candidates detected in said particular region candidate detection step based on a second detection condition;

a specifying step of specifying as a particular region of a detection target said particular region candidate that is included in said region where a face can be detected in said face detection step; and a storing step of storing in a storage medium face information regarding said face detected in said region including said particular region candidate by said face detection step, wherein said computer is caused to change at least one of the first detection condition and the second detection condition between the main portion region and the non-main portion regions of said image, and perform said face detection in said face detection step by reading said face information from said storage medium for use in said face detection when performing said face detection corresponding to a particular region candidate to be next subjected to said face detection.

17. The computer-readable medium according to claim 16, wherein said particular regions include a region of a red eye or a golden eye.

* * * * *